(12) United States Patent
Shiga et al.

(10) Patent No.: US 10,945,223 B2
(45) Date of Patent: Mar. 9, 2021

(54) METHOD FOR DETECTING SYNCHRONIZATION DEVIATION BETWEEN COMMUNICATION STATIONS

(71) Applicant: NATIONAL INSTITUTE OF INFORMATION AND COMMUNICATIONS TECHNOLOGY, Tokyo (JP)

(72) Inventors: Nobuyasu Shiga, Tokyo (JP); Masugi Inoue, Tokyo (JP); Satoshi Yasuda, Tokyo (JP); Kohta Kido, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 132 days.

(21) Appl. No.: 16/076,716

(22) PCT Filed: Jan. 18, 2017

(86) PCT No.: PCT/JP2017/001498
§ 371 (c)(1),
(2) Date: Aug. 9, 2018

(87) PCT Pub. No.: WO2017/138313
PCT Pub. Date: Aug. 17, 2017

(65) Prior Publication Data
US 2019/0045466 A1 Feb. 7, 2019

(30) Foreign Application Priority Data
Feb. 10, 2016 (JP) .............................. JP2016-023851

(51) Int. Cl.
*H04W 56/00* (2009.01)
*G04G 7/00* (2006.01)
(Continued)

(52) U.S. Cl.
CPC ............ *H04W 56/001* (2013.01); *G04G 7/00* (2013.01); *G04G 7/02* (2013.01); *H04L 7/00* (2013.01); *H04W 84/20* (2013.01)

(58) Field of Classification Search
CPC ...... H04W 56/001; H04W 84/20; G04G 7/00; G04G 7/02; H04L 7/00
See application file for complete search history.

(56) References Cited

U.S. PATENT DOCUMENTS

| 7,221,686 | B1 | 5/2007 | Belcea |
| 2007/0140127 | A1 | 6/2007 | Frei |

(Continued)

FOREIGN PATENT DOCUMENTS

| JP | 11-027269 A | 1/1999 |
| JP | 2006-292677 A | 10/2006 |

(Continued)

OTHER PUBLICATIONS

Gerstenhaber et al., "Clock synchronization using processor incorporated with IEEE 1588 and Blackfin", Analog Dialogue 43-11, Nov. 2009, pp. 1-6, www.analog.com/jp/analogdialogue.

(Continued)

*Primary Examiner* — Fahmida S Chowdhury
(74) *Attorney, Agent, or Firm* — Sughrue Mion, PLLC

(57) ABSTRACT

The time of transmission and reception between stations A and B is exchanged, and any deviation in time is calculated in a corresponding manner in the stations. Using the transmission time TXA from station A to B, the transmission time TYB from station B to A, the time TXB of a clock at station B in a transmission from station A to station B, and the clock time TYA at station A in a transmission from station B to A, the following are measured in sequence: 1) station A records the time TXA at which TXA and TYA were transmitted, 2) station B measures the time TXB at which TXA and TYA (Continued)

were received, 3) station B records the time TYB at which TXB and TYB were transmitted, and 4) station A measures the time TYA at which TXB and TYB were received, the transfer time between stations A and B being derived at each station on the basis of the average of the increase ΔTXB-A from TXA to TXB and the increase ΔTYA-B from TYB to TYA, or the deviation in time for a transfer between stations A and B being determined by subtracting the increase ΔTXB-A from the transfer time. The transmission time TXA from station A to B may also be measured using a reflection signal from a transmission terminal.

13 Claims, 16 Drawing Sheets

(51) Int. Cl.
*H04L 7/00* (2006.01)
*H04W 84/20* (2009.01)

(56) References Cited

U.S. PATENT DOCUMENTS

| | | | |
|---|---|---|---|
| 2013/0094523 A1* | 4/2013 | Shen | H04J 3/0658 370/503 |
| 2016/0211935 A1* | 7/2016 | Fair | H04L 7/0037 |

FOREIGN PATENT DOCUMENTS

| | | |
|---|---|---|
| JP | 2009-520401 A | 5/2009 |
| JP | 2012-105152 A | 5/2012 |
| JP | 2015-152308 A | 8/2015 |

OTHER PUBLICATIONS

International Search Report of PCT/JP2017/001498 dated Apr. 18, 2017.

\* cited by examiner

FIG. 1
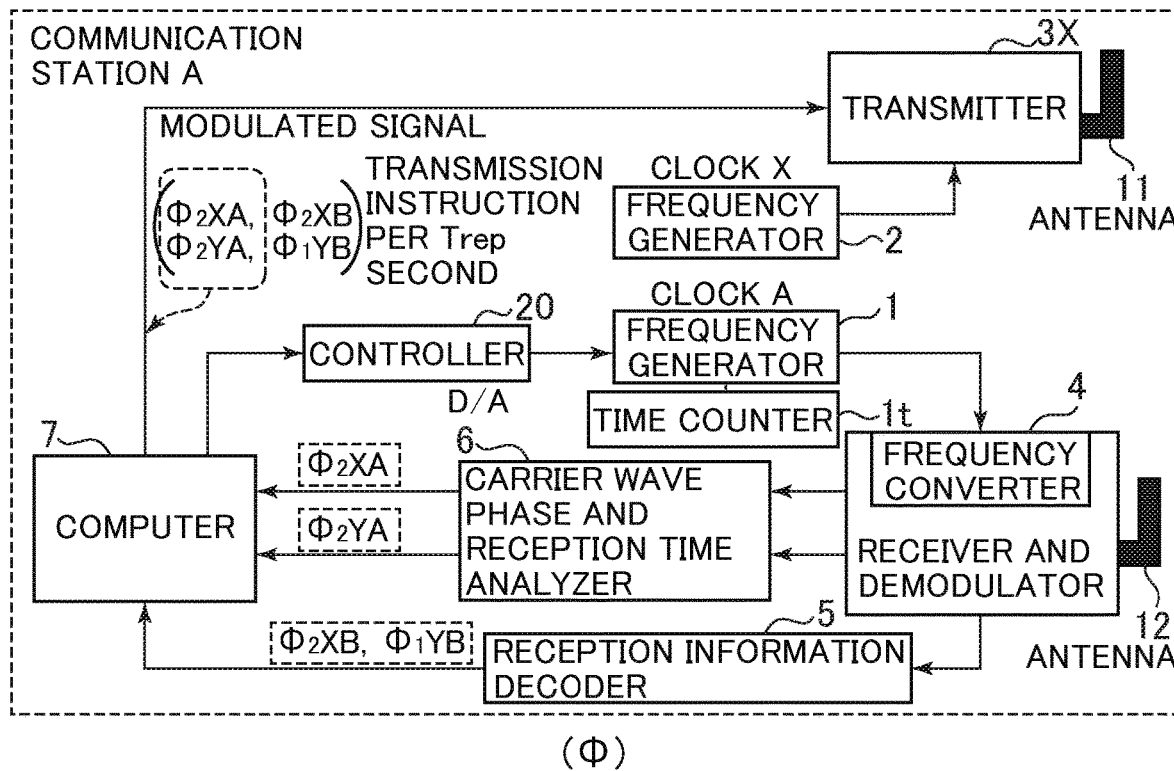
(Φ)
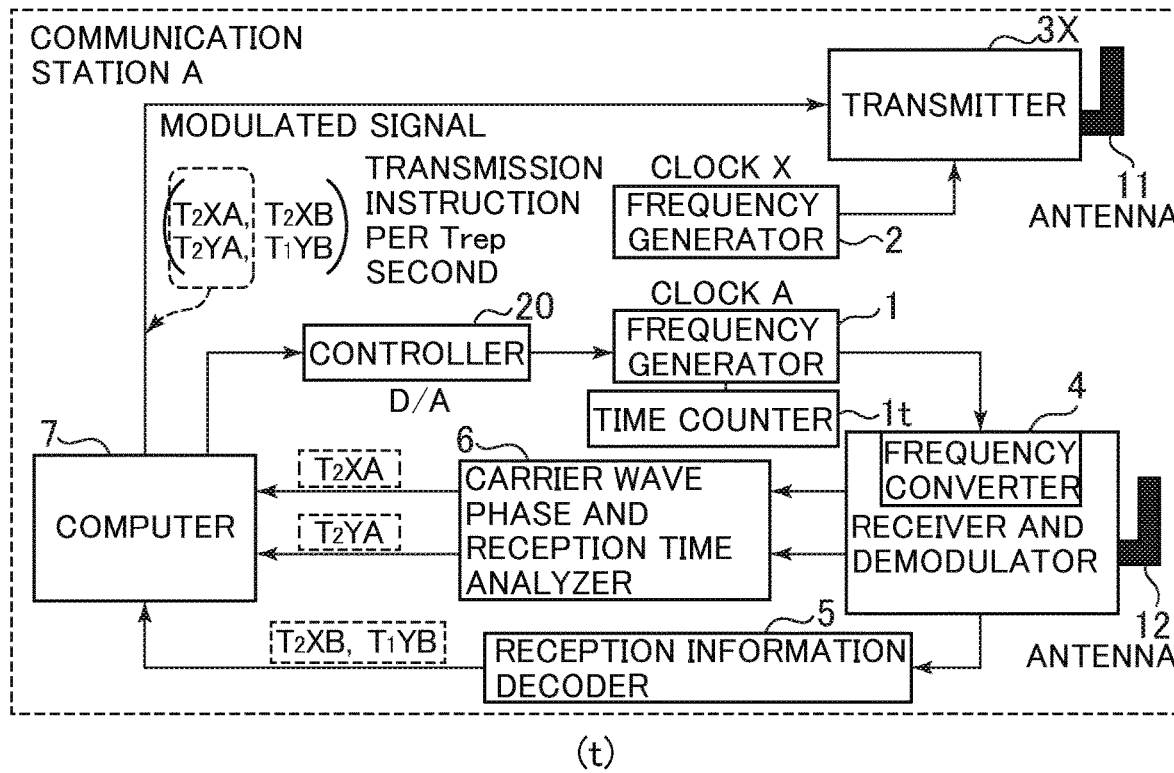
(t)

FIG. 2
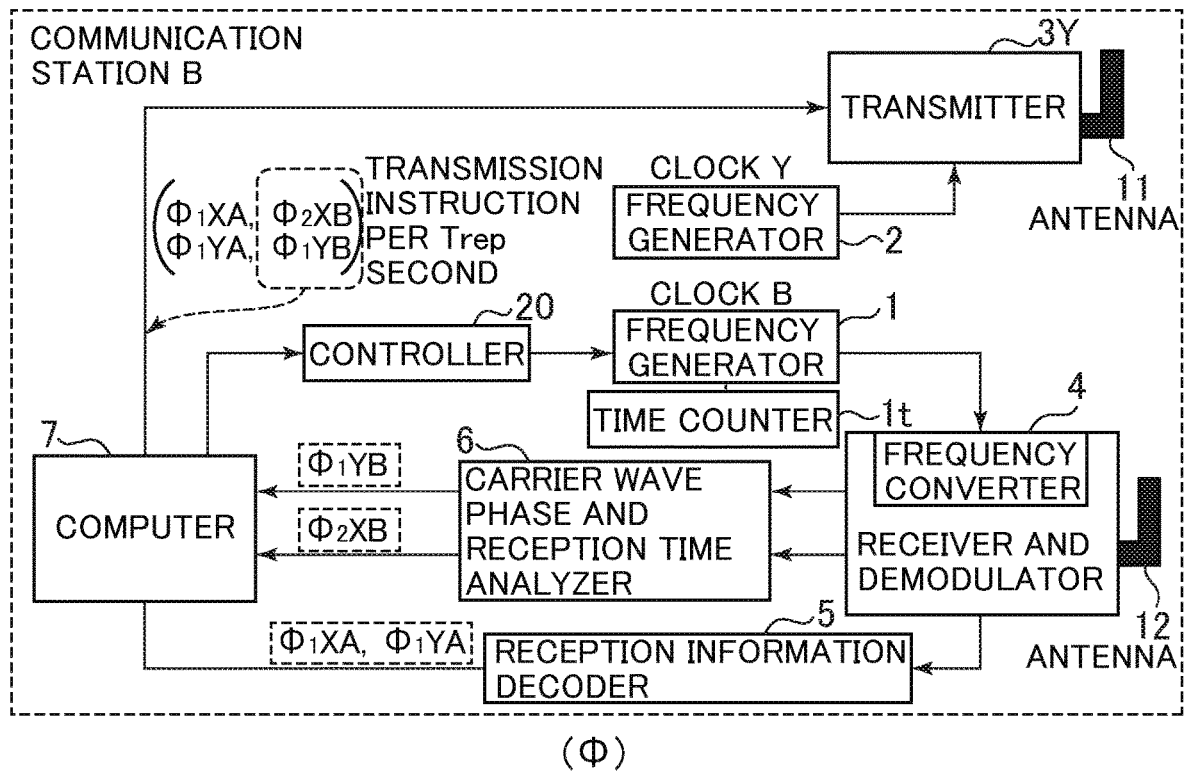
(Φ)
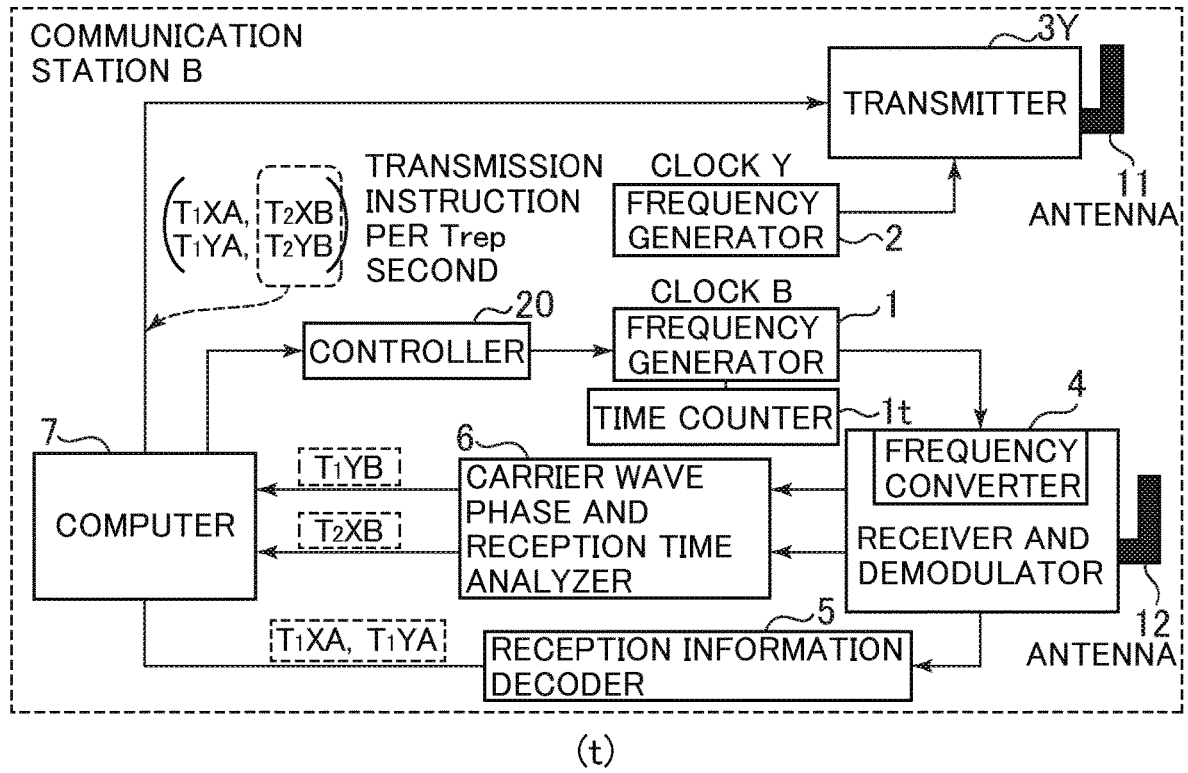
(t)

FIG. 3
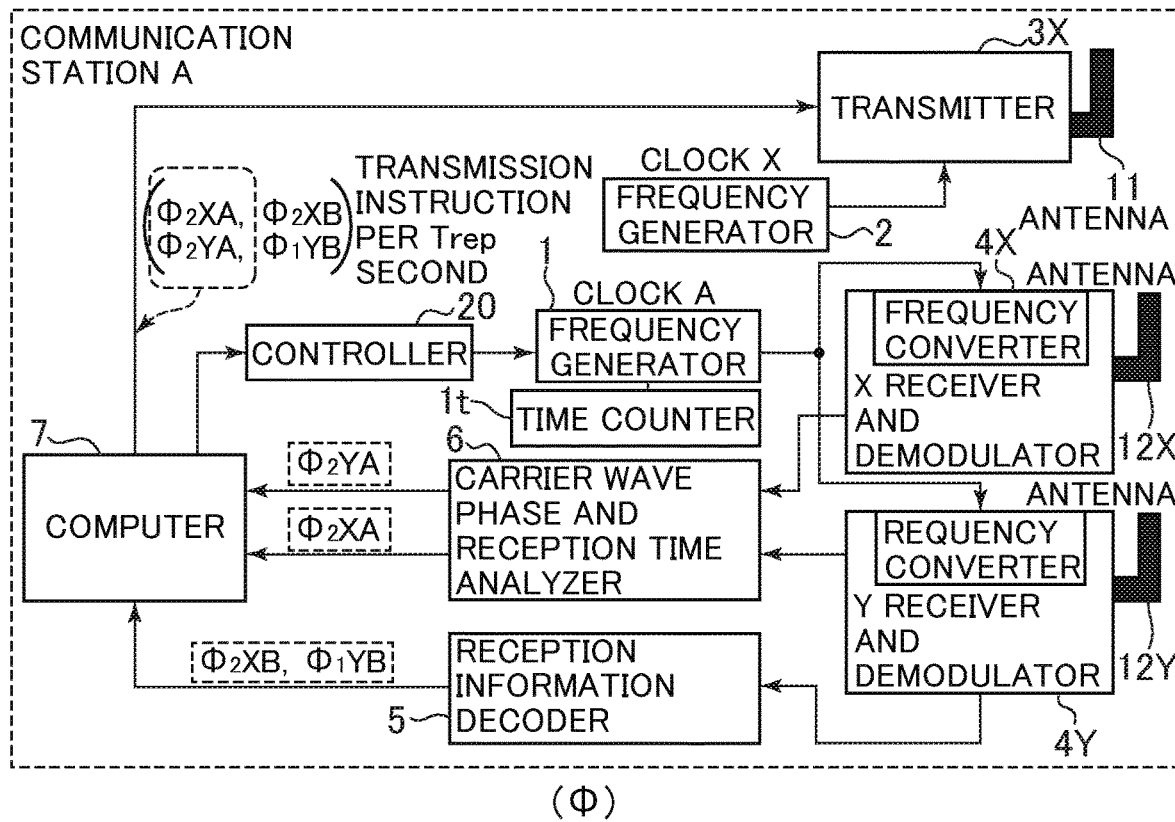
(Φ)
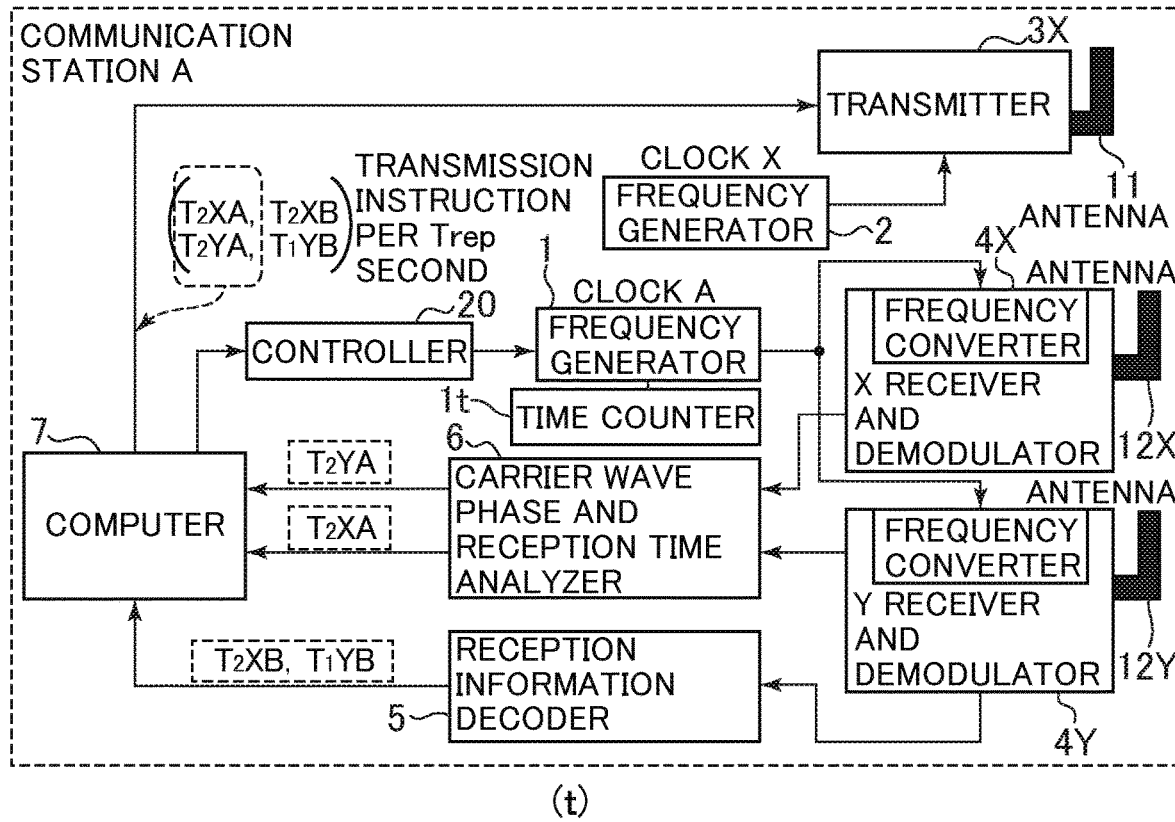
(t)

FIG. 4
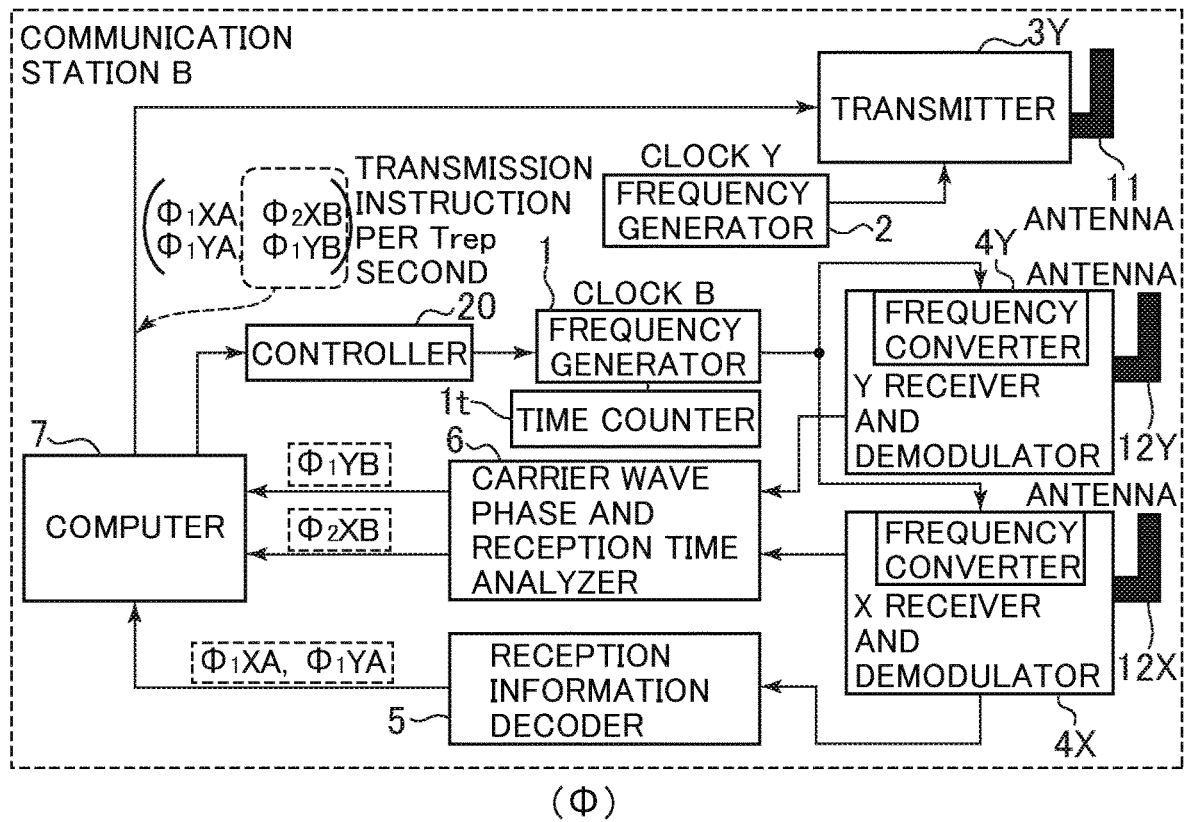
(Φ)
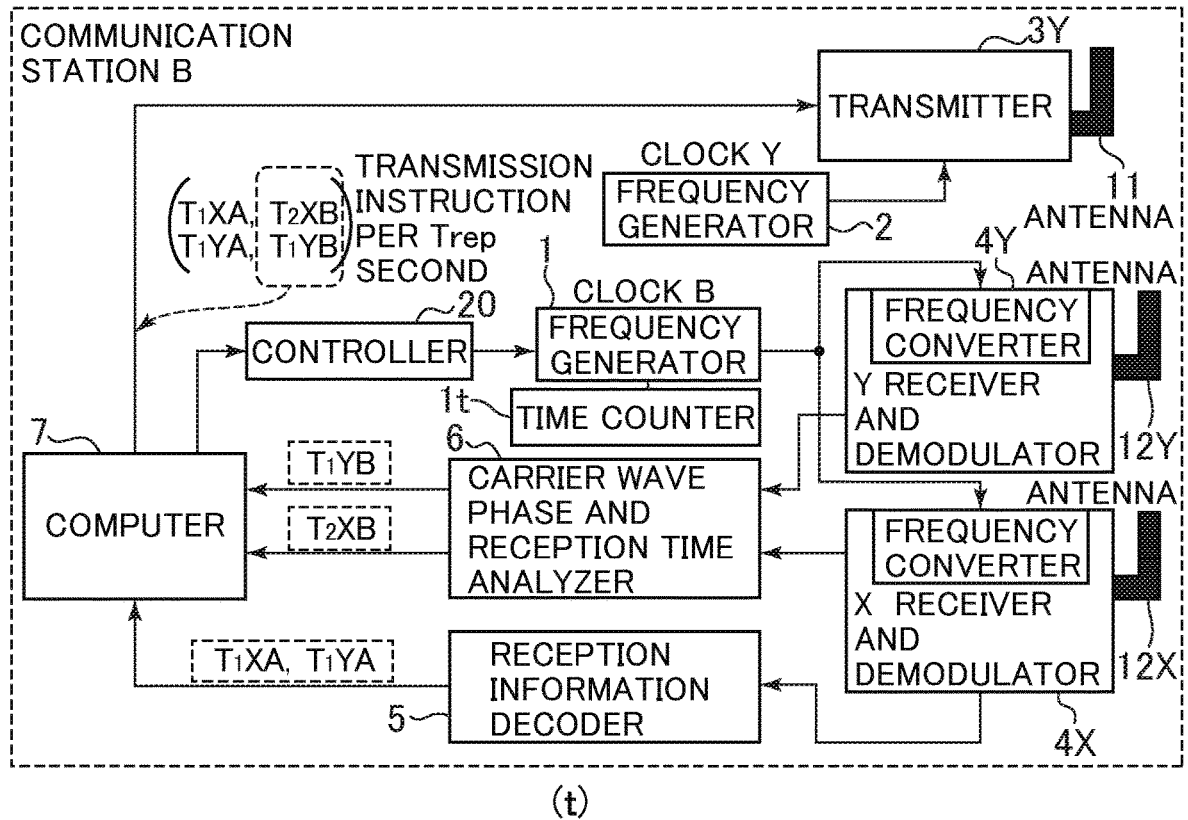
(t)

FIG. 5
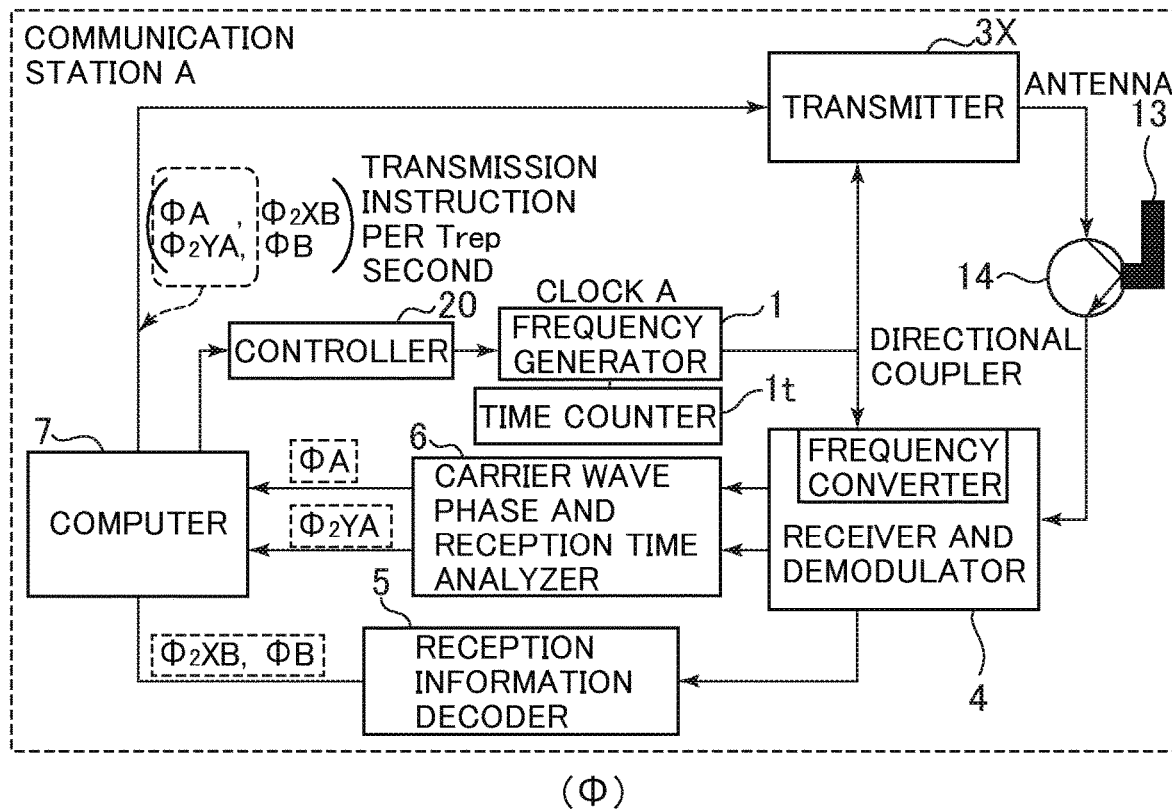
(Φ)
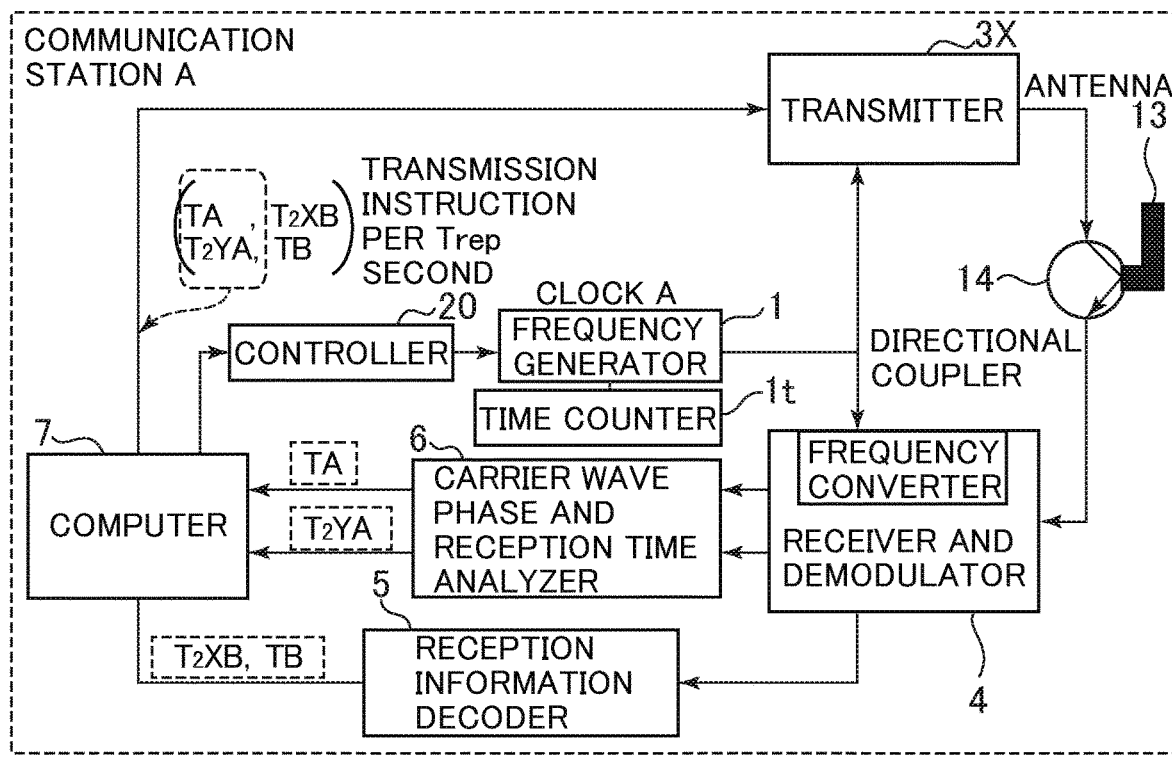
(t)

FIG. 6
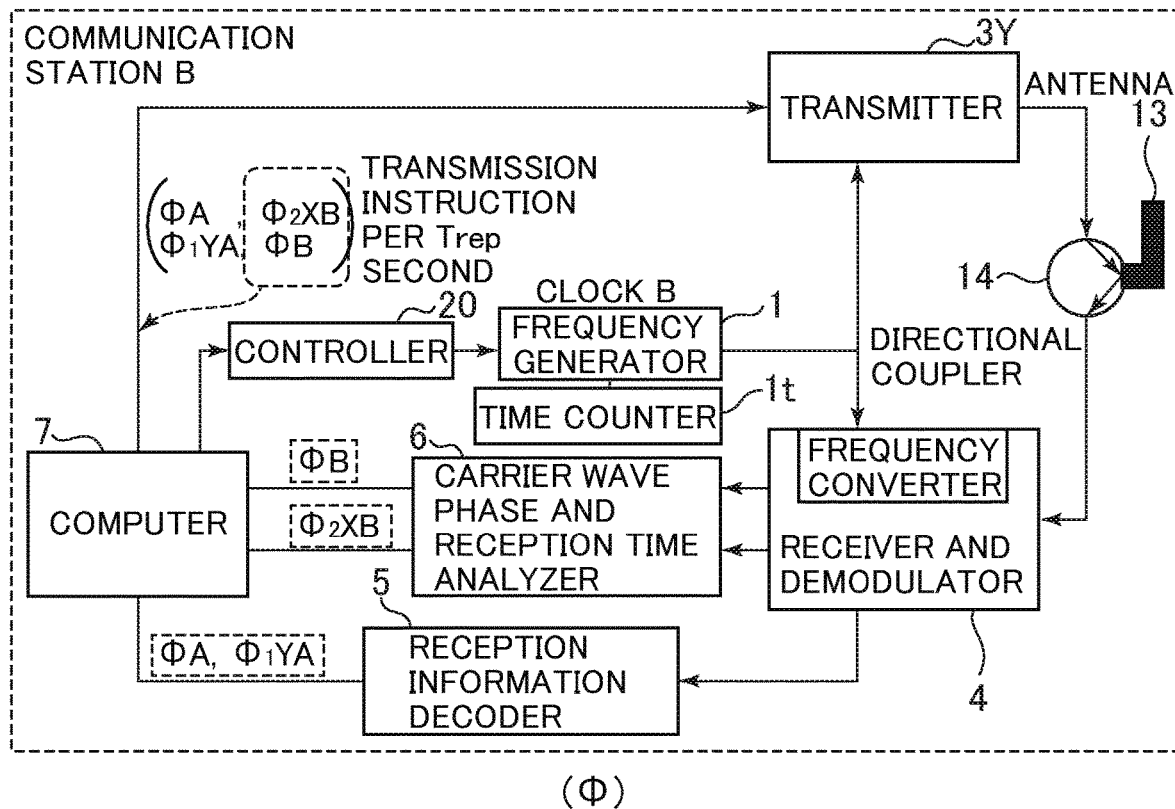
(Φ)
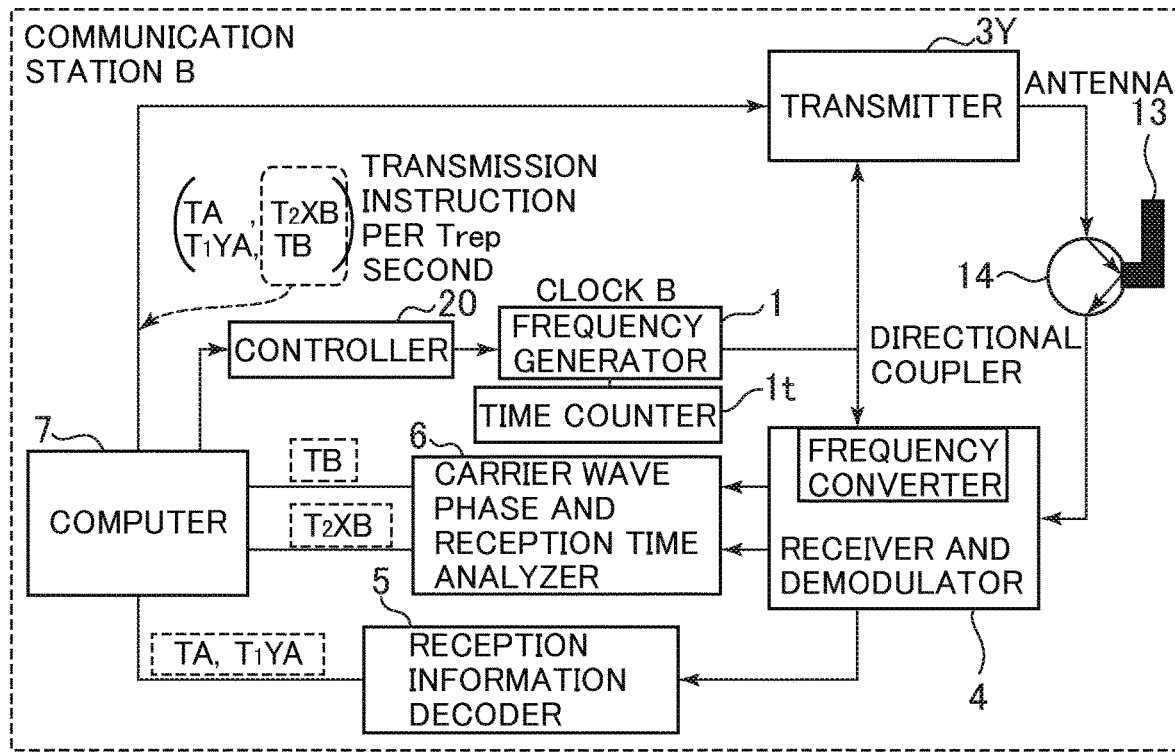
(t)

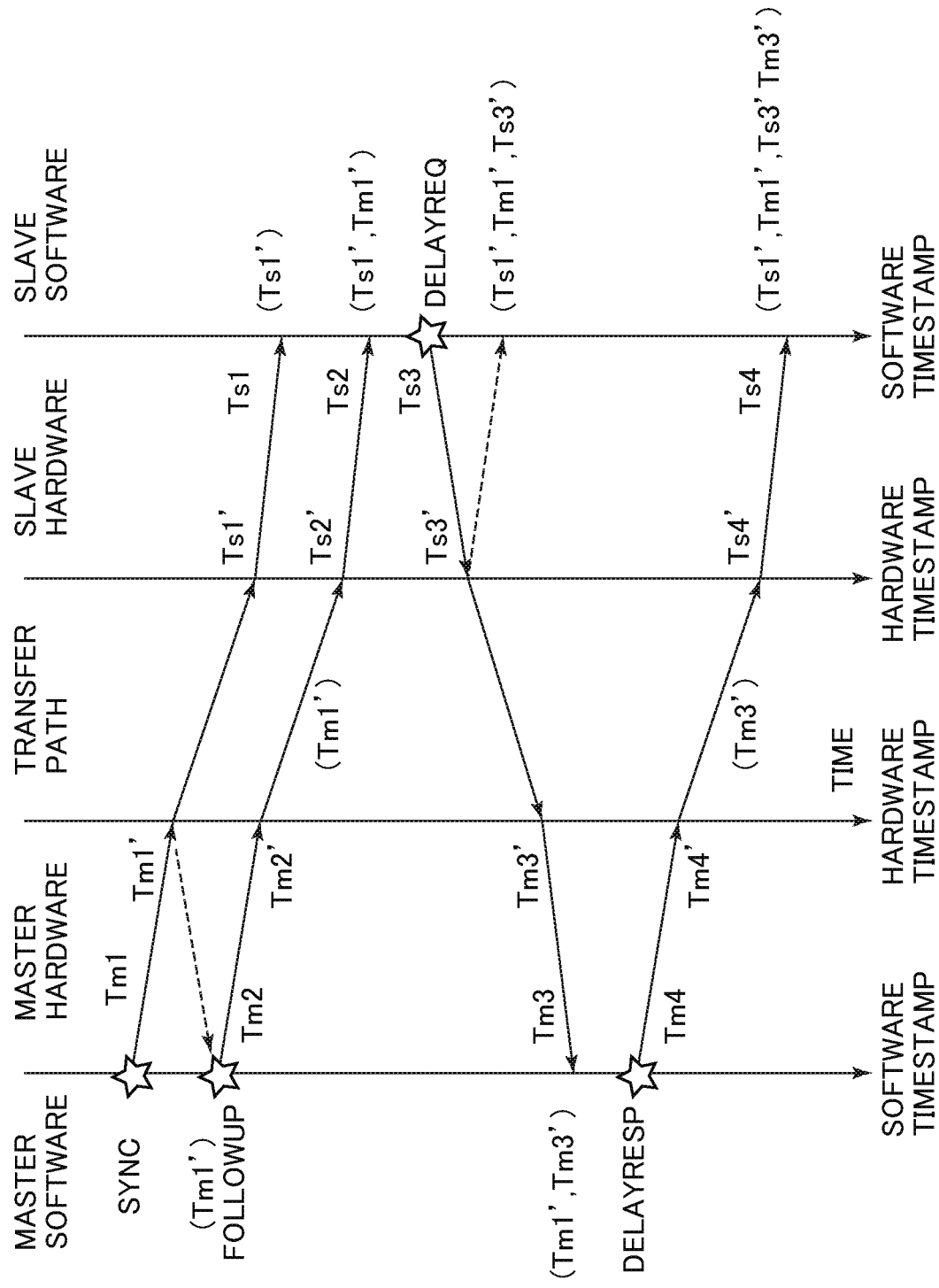

METHOD FOR DETECTING SYNCHRONIZATION DEVIATION BETWEEN COMMUNICATION STATIONS

CROSS REFERENCE TO RELATED APPLICATIONS

This application is a National Stage of International Application No. PCT/JP2017/001498 filed Jan. 18, 2017, claiming priority based on Japanese Patent Application No. 2016-023851 filed Feb. 10, 2016.

TECHNICAL FIELD

The present invention relates to a method for detecting a synchronization deviation between communication stations for synchronizing the time of communication stations that are connected to each other via a communication method (including line or wireless) to be capable of communicating with each other.

BACKGROUND ART

There have already been known methods for synchronizing the time of clocks at distant positions. For example, as described in Cited Reference 1 (Japanese Unexamined Patent Application Publication No. 2006-292677), as precise time transfer of clocks at distant positions, the following are known for example:
1) GPS common view (Common View) (transfer precision: several tens of nanoseconds to several nanoseconds);
2) GPS carrier wave phase (transfer precision: several nanoseconds to several hundreds of picoseconds); and
3) Two way satellite time and frequency transfer (transfer precision: sub-nanoseconds).

However, apparatuses for implementing these methods are not compact or lightweight enough for a general user to carry. In addition, since satellite is used, an equipment for viewing the satellite is necessary. Furthermore, since a spectrum dispersion signal of about several megahertz band width is used as a time signal, a spectrum dispersion modem with a complex structure is necessary, and a wide-band communication method of several megahertz or more is necessary.

As an example not using satellite, as described in PTL (Japanese Unexamined Patent Application Publication No. 2015-152308), a signal is modulated by using a pseudo-noise signal and transmitted as a signal for synchronization, and a reception unit obtains a signal for demodulation from the received signal so as to obtain the time of modulation through a correlation process.

In addition, a known technique to synchronize dispersed clocks on a network is the standardization of a protocol based on the IEEE 1588 standard. This is for adjusting a slave clock so as to match the pace of a master clock. As for measurement of a communication delay in a forward direction (from master to slave) path and in a reverse direction (from slave to master) path, two times of transmission and two times of reception at each of the master and the slave are performed end to end (End to End). For a time stamp (record of local time) at the time of reception and transmission of four messages (Sync, Followup, DelayReq, and DelayResp), a software stamp or a hardware stamp is used.

An exemplary sequence used for this standard is illustrated in FIG. 16. (1) The master reads the current local system time (software timestamp Tm1 at Tm1 and transmits the time by inserting it into a Sync message. This message is later transmitted from the master at Tm1', and this time serves as a hardware timestamp. This message arrives at the slave at Ts1' (slave local time), and after a little delay, slave software receives it at Ts1, reads the hardware timestamp, and acquires Ts1'.

Where Tms is the time difference between clocks of the master and the slave, as long as there is no communication delay, Ts1' equals to the value of (Tm1'+Tms).

(a) After the Sync message has been transmitted, master software reads the transmission time Tm1' of the Sync message from a timestamp unit.

(b) It (Tm1') is inserted into a Followup message, which is transmitted at Tm2. This message is received by slave software at Ts2. At this time point, the slave software has both of the time information items Ts1' (Sync reception time) and Tm1' (Sync transmission time), and a path delay Tmsd between the master and the slave is obtained according to Math. 1.

$$Tmsd = (Ts1' + Tms) - Tm1' \qquad \text{[Math. 1]}$$

(c) In response to the transmission of a DelayReq message from the slave, the master sends a DelayResp message. As illustrated in FIG. 3, with these messages, the delay of the communication path from the slave to the master can be calculated. The slave software reads the current local system time at Ts3 and transmits it by inserting it into the DelayReq message. After the message has been transmitted, the slave software reads a timestamp, acquires a transmission time Ts3' of the message, and waits for a response from the master.

The DelayReq message arrives at the master at Tm3', and is processed by the master software at Tm3. Subsequently, the software reads the timestamp and acquires the reception time Tm3'.

(d) This time value (Tm3') is inserted into the DelayResp message, which is transmitted to the slave at Tm4. The slave software receives the DelayResp message at Ts4 and extracts Tm3', which is time information.

The slave calculates a communication delay Tsmd from the slave to the master according to Math. 2.

$$Tmsd = Tm3' - (Ts3' + Tms) \qquad \text{[Math. 2]}$$

Math. 1 and Math. 2 each include the unknown variable, the time difference Tms between the master and the slave, and Tmsd and Tsmd cannot be obtained individually. Thus, the communication path here is assumed to be symmetric.

$$Tmsd = Tsmd = Td \qquad \text{[Math. 3]}$$

The addition of Math. 1 and Math. 2 obtains the following formula.

$$Td = \frac{1}{2}[(Ts1' - Tm1') + (Tm3' - Ts3')] \qquad \text{[Math. 4]}$$

This calculation is performed by the slave. That is, the slave obtains (A) Tm1' from the Followup message from the master, (B) Ts1' from the reception timestamp, (C) Ts3' from the transmission time stamp, and (D) Tm3' from the Delay-Resp message from the master.

A communication path delay Td is obtained in the above manner, and accordingly, the time difference between the slave and the master can be calculated as follows.

$$Tms = Td - (Ts1' - Tm1')$$

$$Tms = (Tm3' - Ts3') - Td \qquad \text{[Math. 5]}$$

CITATION LIST

Patent Literature

PTL 1: Japanese Unexamined Patent Application Publication No. 2006-292677
PTL 2: Japanese Unexamined Patent Application Publication No. 2015-152308

Non Patent Literature

NPL 1: Gerstenhaber, Michael O'Sullivan, "Device-clock Synchronization using IEEE 1588 and BLACKFIN-incorporated processor", Analog Dialogue 43-11, November (2009), www.analog.com/jp/analogdialogue

SUMMARY OF INVENTION

Technical Problem

According to the present invention, transmission time and reception time at a first communication station and a second communication station that are capable of communicating with each other are transferred therebetween, and any deviation in time is simultaneously calculated in both communication stations. In addition, a signal that is synchronized with a clock signal is transmitted and received between the first communication station and the second communication station, a phase difference between a received signal and the own clock signal is transferred therebetween, and any deviation in phase is simultaneously calculated in both communication stations.

Such characteristics are obviously different from those disclosed in the above Patent Literature, Non Patent Literature, or other related art.

The calculated deviation in time or deviation in phase can be used for matching the clock signal frequency in a phase region, but can also be used as a correction value. Time Transfer is performed by using clocks of timepieces therebetween, and a deviation in time is simultaneously calculated in both communication stations. In order to realize a super-distributed-type timepiece for which a master timepiece is not set regardless of using a plurality of timepieces, instead of locking the time or phase, it is desirable to use information of a deviation in timepiece or a phase difference from the median, which is calculated by a predetermined method, as a correction value.

Solution to Problem

A method for detecting a synchronization deviation between communication stations according to the present invention is a method for detecting, in first and second communication stations selected from among two or more communication stations that are connected to each other via a communication method (including line or wireless) to be capable of communicating with each other, a deviation in time between time information that is transmitted from a transmitter (X) of the first communication station (A) and received by the second communication station (B) and time information that is transmitted from a transmitter (Y) of the second communication station (B) and received by the first communication station (A), the communication stations each clocking time in a corresponding manner and transmitting predetermined empty information in a case of transmission of undetermined time information among transmission time information (TXA) from the first communication station to the second communication station, transmission time information (TYB) from the second communication station to the first communication station, reception time (TXB) of a clock at the second communication station in a transmission from the first communication station to the second communication station, and reception time (TYA) of a clock at the first communication station in a transmission from the second communication station to the first communication station, the method including, in a process including (a1) a step in which the first communication station transmits TXA and TYA and records the transmission time TXA, (a2) a step in which the second communication station receives TXA and TYA and measures and records the reception time TXB, (a3) a step in which the second communication station transmits TXB and TYB and records the transmission time TYB, and (a4) a step in which the first communication station receives TXB and TYB and measures and records the reception time TYA, for a set of input values of TXA, TXB, TYA, and TYB:

deriving, at each station a time it takes for signal to travel (hereinafter reffered to as transfer time) between the first communication station and the second communication station on the basis of an arithmetic mean of an increase ($\Delta$TXB-A) from TXA to TXB and an increase ($\Delta$TYA-B) from TYB to TYA; or determining the deviation in time between the first communication station and the second communication station by subtracting the increase ($\Delta$TXB-A) from the transfer time mentioned above or by subtracting the transfer time from the increase ($\Delta$TYA-B).

Alternatively, instead of the sequence from (a1) to (a4), the following sequence is possible.

(b1) A step in which the first communication station transmits a signal for synchronization and records the transmission time TXA of the signal for synchronization, (b2) a step in which the second communication station receives the signal for synchronization and TXA and records the reception time TXB of the signal for synchronization, (b3) a step in which the second communication station transmits a signal for synchronization and TXB and records the transmission time TYB of the signal for synchronization, (b4) a step in which the first communication station receives the signal for synchronization and TXB and records the reception time TYA of the signal for synchronization, (b5) a step in which the first communication station transmits at least TXA and TYA, (b6) a step in which the second communication station receives at least TXA and TYA, (b7) a step in which the second communication station transmits at least TYB, and (b8) a step in which the first communication station receives at least TYB, for a set of input values of TXA, TXB, TYA, and TYB, deriving, at each station, a transfer time of signal between the first communication station and the second communication station on the basis of an arithmetic mean of an increase ($\Delta$TXB-A) from TXA to TXB and an increase ($\Delta$TYA-B) from TYB to TYA, or determining the deviation in time between the first communication station and the second communication station by subtracting the increase (ΔTXB-A) from the transfer time or by subtracting the transfer time from the increase (ΔTYA-B) is included.

The transmission time information (TXA) from the first communication station to the second communication station and the transmission time information (TYB) from the second communication station to the first communication station are each measured by receiving a reflection signal from a corresponding transmission terminal.

The transmission time information (TXA) from the first communication station to the second communication station, the transmission time information (TYB) from the second communication station to the first communication station, the reception time (TXB) of a clock at the second communication station in a transmission from the first communication station to the second communication station, and the reception time (TYA) of a clock at the first communication station in a transmission from the second communication station to the first communication station are each information in a state in which phases of the clocks A and B are synchronized.

Alternatively, instead of the sequence from (a1) to (a4), the following sequence is possible.

Note that the transmission time information (TXA) transmitted from the first communication station is used as a signal for synchronization transmitted from the first communication station, and the transmission time information (TYB) transmitted from the second communication station is used as a signal for synchronization transmitted from the second communication station.

In a process including (c1) a step in which the first communication station transmits the scheduled transmission time TXA and records the transmission time TXA, (c2) a step in which the second communication station receives TXA and records its reception time TXB, (c3) a step in which the second communication station transmits TXB and its transmission time scheduled time TYB and records the transmission time TYB of TXB, (c4) a step in which the first communication station receives TXB and TYB and records its reception time TYA, (c5) a step in which the first communication station transmits at least TYA, and (c6) a step in which the second communication station receives at least TYA, for a set of input values of TXA, TXB, TYA, and TYB, deriving, at each station, a transfer time of signal between the first communication station and the second communication station on the basis of an arithmetic mean of an increase (ΔTXB-A) from TXA to TXB and an increase (ΔTYA-B) from TYB to TYA, or determining the deviation in time between the first communication station and the second communication station by subtracting the increase (ΔTXB-A) from the transfer time or by subtracting the transfer time from the increase (ΔTYA-B) is included.

Alternatively, a method for detecting a synchronization deviation between communication stations according to the present invention is a method for detecting, in first and second communication stations selected from among two or more communication stations that are connected to each other via a communication method to be capable of communicating with each other, a deviation in time between time information that is transmitted from a transmitter (X) of the first communication station (A) and received by the second communication station (B) and time information that is transmitted from a transmitter (Y) of the second communication station (B) and received by the first communication station (A), the communication stations each clocking time in a corresponding manner, the second communication station receiving a first communication station signal that is transmitted from the first communication station and is synchronized with a clock X signal of the first communication station, the first communication station receiving a second communication station signal that is transmitted from the second communication station and is synchronized with a clock Y signal of the second communication station, the method including, if the first and second communication station signals have a phase difference that is converted into a predetermined common frequency:

(d1) by the first communication station, transmitting the first communication station signal, receiving the transmitted first communication station signal, and measuring a phase difference ($\Phi_1 XA$) between the received first communication station signal and a clock A signal of the first communication station signal;

(d2) by the second communication station, receiving the first communication station signal and measuring a phase difference ($\Phi_1 XB$) between the received first communication station signal and a clock B signal from the second communication station;

(d3) by the second communication station, transmitting the second communication station signal and the phase difference ($\Phi_1 XB$), receiving the transmitted second communication station signal, and measuring a phase difference ($\Phi_1 YB$) between the received second communication station signal and the clock B signal from the second communication station;

(d4) by the first communication station, receiving the second communication station signal and the phase difference ($\Phi_1 XB$) and measuring a phase difference ($\Phi_1 YA$) between the received second communication station signal and the clock A signal from the first communication station;

(d5) by the first communication station, transmitting the first communication station signal, the phase difference ($\Phi_1 XA$), and the phase difference ($\Phi_1 YA$) and receiving the transmitted first communication station signal;

(d6) by the second communication station, receiving the first communication station signal, the phase difference ($\Phi_1 XA$), and the phase difference ($\Phi_1 YA$) and measuring a phase difference ($\Phi_2 XB$) between the received first communication station signal and the clock B signal from the second communication station;

(d7) by the second communication station, transmitting at least the phase difference ($\Phi_1 YB$);

(d8) by the first communication station, receiving at least the phase difference ($\Phi_1 YB$); and for a phase difference $\Phi X$ obtained by subtracting the phase difference ($\Phi_1 XA$) from the phase difference ($\Phi_1 XB$) and a phase difference $\Phi Y$ obtained by subtracting the phase difference ($\Phi_1 YB$) from the phase difference ($\Phi_1 YA$), deriving a phase difference due to transmission between the first communication station and the second communication station on the basis of an arithmetic mean of the transfer phase differences $\Phi X$ and $\Phi Y$, and deriving a phase difference due to a deviation in time at the second communication station from time of the first communication station on the basis of an arithmetic mean of phase differences $\Phi X$ and $-\Phi Y$.

The phase difference ($\Phi XA$) transmitted from the first communication station to the second communication station and the phase difference ($\Phi YB$) transmitted from the second communication station to the first communication station are each measured by receiving a reflection signal from a corresponding transmission terminal.

In the measurement of the phase difference, the phase difference is an unwrapped value using a predetermined time as a starting point.

Alternatively, instead of the sequence from (d1) to (d8), the following sequence is possible.

Note that a clock X is a signal synchronized with the clock A or a signal generated from a split signal of the clock A, and for the first communication station signal transmitted from the first communication station, a phase difference between the received first communication station signal and the clock A signal of the first communication station is a predetermined phase difference ($\Phi A$), and a clock Y is a signal synchronized with the clock B or a signal generated from a split signal of the clock B, and for the clock B signal of the second communication station transmitted from the second communication station, a phase difference between the received second communication station signal and the second communication station signal is a predetermined phase difference ($\Phi B$).

(e1) By the first communication station, transmitting the first communication station signal and the phase difference ($\Phi A$), (e2) by the second communication station, receiving the first communication station signal and the phase difference ($\Phi A$) and measuring a phase difference ($\Phi_1 XB$) between the received first communication station signal and the second communication station signal, (e3) by the second communication station, transmitting the second communication station signal, the phase difference ($\Phi B$), and the phase difference ($\Phi_1 XB$), (e4) by the first communication station, receiving the second communication station signal, the phase difference ($\Phi B$), and the phase difference ($\Phi_1 XB$) and measuring a phase difference ($\Phi_1 YA$) between the received second communication station signal and the first communication station signal, (e5) by the first communication station, transmitting at least the phase difference ($\Phi_1 YA$), (e6) by the second communication station, receiving at least the phase difference ($\Phi_1 YA$), and for a phase difference $\Phi X$ obtained by subtracting the phase difference ($\Phi A$) from the phase difference ($\Phi_1 XB$) and a phase difference $\Phi Y$ obtained by subtracting the phase difference ($\Phi B$) from the phase difference ($\Phi_1 YA$), deriving a phase difference between the first communication station and the second communication station on the basis of an arithmetic mean of $\Phi X$ and the phase difference $\Phi Y$ and deriving a phase difference due to a deviation in time at the second communication station from the time of the first communication station on the basis of an arithmetic mean of phase differences $\Phi X$ and $-\Phi Y$ are included.

In the first communication station or the second communication station, by using an offset phase difference generated from each reception point to a phase-difference measurement point, the received phase difference is desirably corrected.

Communication between the first communication station and the second communication station may be wireless communication, and the first communication station signal or the second communication station signal may be a carrier wave that has been modulated by using information containing the phase difference $\Phi XB$ or $\Phi YA$.

The wireless communication between the first communication station and the second communication station may be performed by using a common frequency channel in a time shared manner.

In the wireless communication between the first communication station and the second communication station, a frequency channel in downstream communication from the first communication station to the second communication station and a frequency channel in upstream communication from the second communication station to the first communication station may be different, and the downstream communication and the upstream communication can be performed in time slots that are partially overlapped with each other.

The following may alternatively be included.

The first communication station and the second communication station each records the integrated phase of a clock signal starting from a time point converted into a predetermined time point of the first communication station or the second communication station, and a quotient modulo $2\pi$ rad of each integrated phase is used as time, the first communication station transmits information containing the time (TXB) and the phase difference ($\Phi XB$) of the first communication station, and the second communication station transmits information containing the time (TYA) and the phase difference ($\Phi YA$) of the second communication station, the first communication station corrects the phase difference by a transition in stored data of a phase obtained on the basis of an arithmetic mean of the time (TXB) of the first communication station and the received time (TYA) or corrects the deviation in time at the first communication station on the basis of an arithmetic mean of the time (TXB) and time (−TYA), and the second communication station corrects the phase difference by a transition in stored data of a phase obtained on the basis of an arithmetic mean of the time (TYA) of the second communication station and the received time (TXB) or corrects the deviation in time at the second communication station on the basis of an arithmetic mean of the time (TYA) and time (−TXB).

The detection of a synchronization deviation between two or more communication stations includes categorizing the second communication station, for which detection of a synchronization deviation from the predetermined first communication station has been completed, into a first communication station group together with the predetermined first communication station, and categorizing a communication station group, for which detection of a synchronization deviation is yet to be completed, into a second communication station group, and sequentially performing detection of a synchronization deviation between communication stations for a pair of the first communication station and the second communication station according to an order, the order being feasible by a method for determining the order of detection of a synchronization deviation by performing the following operation until there is no communication station categorized into the second communication station group, if a communication station selected from the second communication station group (f1) is capable of communicating with a communication station belonging to the first communication station group, the category of the selected communication station is transferred from the second communication station group to the first communication station group, or (f2) is not capable of communicating with a communication station belonging to the first communication station group, a new second communication station is selected from the second communication station group, and the process returns to (f1), and thereby a synchronization deviation between three or more communication stations that are joined in series can be detected.

The detection of a synchronization deviation between two or more communication stations includes categorizing a communication station that is determined as being capable of communicating with the predetermined first communication station into a candidate first communication station group together with the first communication station and categorizing a communication station that is not determined as being capable of communicating into a candidate second communication station group, selecting one of orders that are feasible by a method for determining the order of a pair of communication stations for applying the method for detecting a synchronization deviation between communication stations by performing the following operation until there is no communication station categorized into the candidate second communication station group, for a new communication station selected from the candidate second communication station group, (g1) if communication with a communication station belonging to the candidate first communication station group is possible, the category of the selected communication station is transferred from the candidate second communication station group to the candidate first communication station group, or (g2) if communication with a communication station belonging to the candidate first communication station group is not possible, a new communication station is selected from the candidate second communication station group, and the process returns to (g1), and detecting a synchronization deviation between two or more communication stations by sequentially performing communication from the first communication station to a communication station that is selected as the second communication station according to the selected order, and when the order comes to an end, performing communication from the last second communication station to the first communication station in the reverse order.

Thus, the detection of a synchronization deviation from a plurality of communication stations can be almost simultaneously performed for a single communication station. That is, first, the order of communication is determined, and then the first communication station is fixed during the operation for a single time of detection of a synchronization deviation, and the second communication station is sequentially switched. By this method, the detection of a synchronization deviation between communication stations among three or more communication stations that are joined in parallel can be almost simultaneously performed.

Advantageous Effects of Invention

According to the present invention, transmission time and reception time at a first communication station and a second communication station that are capable of communicating with each other are transferred therebetween, and any deviation in time is simultaneously calculated in both communication stations. Similarly, in addition to a signal that is synchronized with a clock signal, a phase difference between a received signal and the own clock signal is transferred between the first communication station and the second communication station, and any deviation in phase can be simultaneously calculated in both communication stations.

BRIEF DESCRIPTION OF DRAWINGS

FIG. 1 is a block diagram illustrating an apparatus configuration example to which the present invention is applied, in which ($\Phi$) is related to a phase and (t) is related to time, and is a configuration example of a wireless communication station A in which a frequency generator (1) that generates a clock A performs autonomous oscillation.

FIG. 2 is a block diagram illustrating an apparatus configuration example to which the present invention is applied, in which ($\Phi$) is related to a phase and (t) is related to time, and is a configuration example of a wireless communication station B in which a frequency generator (1) that generates a clock B is operated in phase synchronization with the frequency generator (1) that generates the clock A in the wireless communication station A in FIG. 1.

FIG. 3 is a block diagram illustrating a configuration example of the communication station A, in which ($\Phi$) is related to a phase and (t) is related to time and an antenna and a receiver and demodulator are divided into ones for receiving a electromagnetic wave from a virtual reference station of the own station and ones for receiving a electromagnetic wave from a partner station.

FIG. 4 is a block diagram illustrating a configuration example of the communication station B, in which ($\Phi$) is related to a phase and (t) is related to time and an antenna and a receiver and demodulator are divided into ones for receiving a electromagnetic wave from a virtual reference station of the own station and ones for receiving a electromagnetic wave from a partner station.

FIG. 5 is a block diagram illustrating an apparatus configuration example of the communication station A, in which ($\Phi$) is related to a phase and (t) is related to time, a shared antenna is used as a transmission antenna and a reception antenna, and the clock A is used in place of a clock X.

FIG. 6 is a block diagram illustrating an apparatus configuration example of the communication station B, in which ($\Phi$) is related to a phase and (t) is related to time and a shared antenna is used as a transmission antenna and a reception antenna.

FIG. 16 is a time chart illustrating an example of a sequence in accordance with a standard protocol of the IEEE 1588 standard according to the related art.

DESCRIPTION OF EMBODIMENTS

Figure 7:
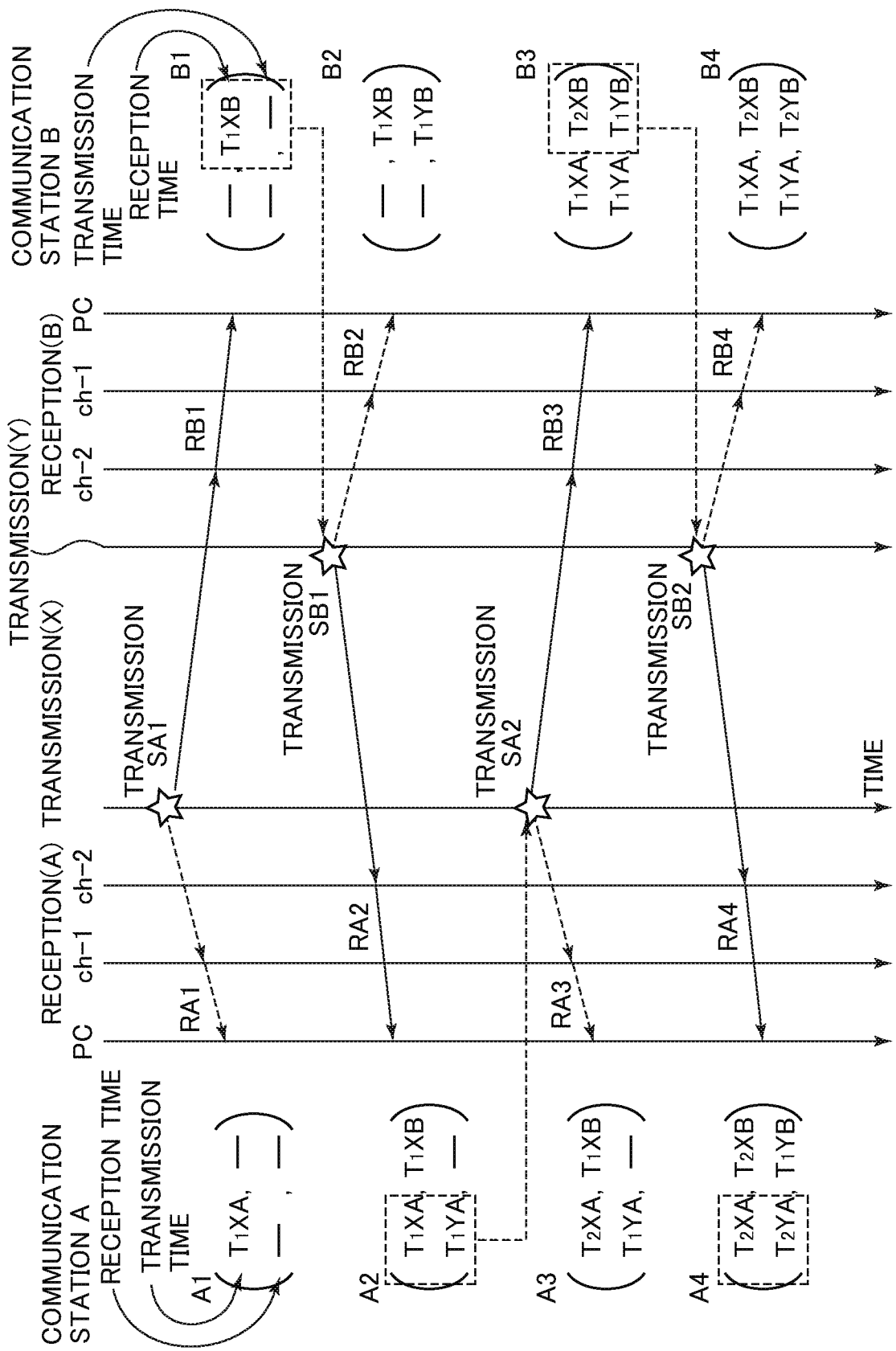
FIG. 7 is a time chart illustrating a sequence in which a method for detecting a synchronization deviation between communication stations according to the present invention is applied to the apparatus configurations in FIGS. 1 and 2 or FIGS. 3 and 4 in terms of time.

Embodiments of the present invention will be described below in detail with reference to the drawings. In the following description, the same reference numeral is used for apparatuses having the same or similar functions unless otherwise specified.

In the following embodiments, first, a method for detecting a synchronization deviation between communication stations, which are two communication stations selected from among two or more communication stations, will be described. Then, examples of expanding this detecting method to three or more communication stations will be described.

The time in the following description means time that is recorded as digital information (hereinafter referred to as counter time) or time derived from an integrated phase (hereinafter referred to as phase time). The phase time here is the following one. That is, the integrated phase from a predetermined time point of a clock signal is a sum of a multiple of $2\pi$ rad and a phase smaller than $2\pi$ rad. In addition, the region of a phase and a phase difference in the following description is limited to a value $2\pi$ rad or less. Accordingly, for example, if correct counter time information is not transferred due to noise in the communication path, or if unwrapping of a phase difference performed inappropriately, a deviation occurs between the counter time and the phase time.

First Embodiment

Each of the block diagrams in FIGS. 1 and 2 illustrates an apparatus configuration example to which the present invention is applied, in which (Φ) is the configuration example related to a phase and (t) is the configuration example related to time. In each wireless communication station A in the configuration examples in FIG. 1 (Φ) and (t), each of a frequency generator (2) that generates a clock X and a frequency generator (1) that generates a clock A to be input to a receiver and demodulator (4) is a configuration example of a self-controlled frequency generator. At each wireless communication station B in FIG. 2 (Φ) and (t), a configuration example is illustrated in which a frequency generator (1) that generates a clock B via the receiver and demodulator (4) is operated in phase synchronization with the frequency generator (1) that generates the clock A in the communication station A. Note that the transmission and reception between the communication stations A and B are performed by using the same frequency and are managed by a computer 7 in a time shared manner.

That is, the communication stations A and B have substantially the same circuit configuration, but synchronization of the frequency generator (1) with another station is switched by using an external signal. The present invention is applicable to synchronous setting and non-synchronous setting of the communication station B with the frequency generator (1) of the communication station.

Although wireless communication is performed in these configuration examples, the present invention is applicable to any environment in which signals described below can be transferred, and is easily applicable to wired communication using an electric wire, an optical fiber, and the like.

In FIG. 1, a clock X signal contained in a electromagnetic wave that has been input through an antenna 12 and the clock A from the frequency generator (1) are mixed in the receiver and demodulator (4), and its phase difference is measured by a carrier wave phase and reception time analyzer (6). The measurement result is input to the computer (7). The computer (7) receives information from the communication station B, which has been demodulated by the receiver and demodulator (4), through a reception information decoder (5). This information is time information or phase information and may contain information on the above-described synchronous/non-synchronous setting. In the example of FIG. 1, the information on the synchronous/non-synchronous setting is supplied from the computer (7) to a controller 20. Since a feedback signal used for synchronization is a pulse signal, the computer (7) performs control during intervals between feedback signals. This control may be control to maintain a control signal while the feedback signal is absent or may be nonlinear control such as proportional-integral-derivative control (PID control). The computer (7) also controls the transmission of a transmitter (3X) to implement time shared communication at the common frequency. The computer (7) further performs control related to transmission details and transmission time from the transmitter (3X), stores data necessary for detecting a synchronization deviation including integration of phases and phase differences, and performs data processing.

FIG. 2 illustrates the configuration example of the communication station B, in which (Φ) is the configuration example related to the phase and (t) is the configuration example related to the time. As described above, the difference from the communication station A is to synchronize the clock of the frequency generator (1) of the own station (communication station B) with the frequency generator (1) of the communication station A.

FIGS. 3 and 4 are configuration examples for avoiding a time-shared operation and use two frequencies, in which (Φ) is the configuration example related to the phase and (t) is the configuration example related to the time. That is, the antenna and the receiver and demodulator are divided into ones for receiving an electromagnetic wave from a virtual reference station of the own station and ones for receiving an electromagnetic wave from the partner station. FIG. 3 illustrates the configuration example of the communication station A, and FIG. 4 illustrates the configuration example of the communication station B.

These configuration examples are advantageous in that transmission and reception can be performed simultaneously. Accordingly, the transfer time and any deviation in time can be measured more accurately than in a case of the configurations in FIGS. 1 and 2, especially when the antenna position is moving. Furthermore, the deviation in time can be detected more frequently so as to acquire more detailed information.

FIG. 7 is a time chart illustrating a sequence in which the method for detecting a synchronization deviation between communication stations according to the present invention is applied to the apparatus configurations in FIGS. 1 and 2 and FIGS. 3 and 4 in terms of the time. It should be noted that in FIGS. 1 and 2 and FIGS. 3 and 4, diagrams (Φ) are referred to for the phase, and diagrams (t) are referred to for the time, in the first embodiment.

First, this method is a method for detecting, in a first communication station (i.e., the communication station A that transmits a signal synchronized with the clock X) and a second communication station (i.e., the communication station B that transmits a signal synchronized with a clock Y) selected from among two or more communication stations that are connected to each other via a communication method to be capable of communicating with each other, a deviation in time between the time (i.e., the time based on the clock A) of the first communication station and the time (i.e., the time based on the clock B) of the second communication station, the communication stations each clocking time in a corresponding manner.

Predetermined empty information is transmitted in a case of transmission of undetermined time information among transmission time information (TXA) from the first communication station to the second communication station, transmission time information (TYB) from the second communication station to the first communication station, reception time (TXB) of a clock at the second communication station in a transmission from the first communication station to the second communication station, and reception time (TYA) of a clock at the first communication station in a transmission from the second communication station to the first communication station. The transmission time information from each station in this case is the reception time at which a signal transmitted from the transmitter (3) of the own station was received by the receiver and demodulator (4, 4X, or 4Y) of the own station.

(1) The first communication station transmits a signal for synchronization at the time point of SA1 in FIG. 7 and receives and records the transmission time $T_1XA$ of the signal for synchronization at the time point of RA1. A1 represents the details of a register A provided in the computer (7) of the communication station A at this time point.

(2) The second communication station receives the signal for synchronization at RB1 and records the reception time $T_1XB$ of the signal for synchronization. B1 represents the details of a register B provided in the computer (7) of the communication station B at this time point.

(3) The second communication station transmits a signal for synchronization and $T_1XB$ at SB1 and receives and records the transmission time $T_1YB$ of the signal for synchronization at RB2. B2 represents the details of the register B at this time point.

(4) The first communication station receives the signal for synchronization and $T_1XB$ at RA2 and records the reception time $T_1YA$ of the signal for synchronization. A2 represents the details of the register A at this time point.

(5) The first communication station transmits at least $T_1XA$ and $T_1YA$ at SA2 among the signal for synchronization, $T_1XA$, and $T_1YA$. A3 represents the details of the register A obtained as a result of reception.

(6) The second communication station receives at least $T_1XA$ and $T_1YA$ at RB3 among the signal for synchronization, $T_1XA$, and $T_1YA$. B3 represents the details of the register B at this time point.

(7) The second communication station transmits at least $T_1YB$ at SB2.

(8) The first communication station receives at least $T_1YB$ at RA4. A4 represents the details of the register A at this time point.

In a process including this sequence, for a set of input values of $T_1XA$, $T_1XB$, $T_1YA$, and $T_1YB$, a transfer time of signal (Tp) between the first communication station and the second communication station is derived at each communication station on the basis of an arithmetic mean of an increase ($\Delta TX_{B-A}$) from $T_1XA$ to $T_1XB$ and an increase ($\Delta TY_{A-B}$) from $T_1YB$ to $T_1YA$. That is, $$Tp = \frac{1}{2}(\Delta TX_{B-A} + \Delta TY_{A-B}) \qquad \text{[Math. 6]}$$
$$= \frac{1}{2}[(T_1XB - T_1XA) + (T_1YA - T_1YB)].$$

The deviation in time (Tc) between the first communication station and the second communication station is determined by subtracting the increase ($\Delta TX_{B-A}$) from the transfer time (Tp) or by subtracting the transfer time (Tp) from the increase ($\Delta TY_{A-B}$). That is, $Tc=Tp-(T_1XB-T_1XA)=(T_1YA-T_1YB)-Tp$, and the following representation is also possible.

$$Tc = \frac{1}{2}(\Delta TY_{A-B} - \Delta TX_{B-A}) \qquad \text{[Math. 7]}$$

Second Embodiment

Figure 8:
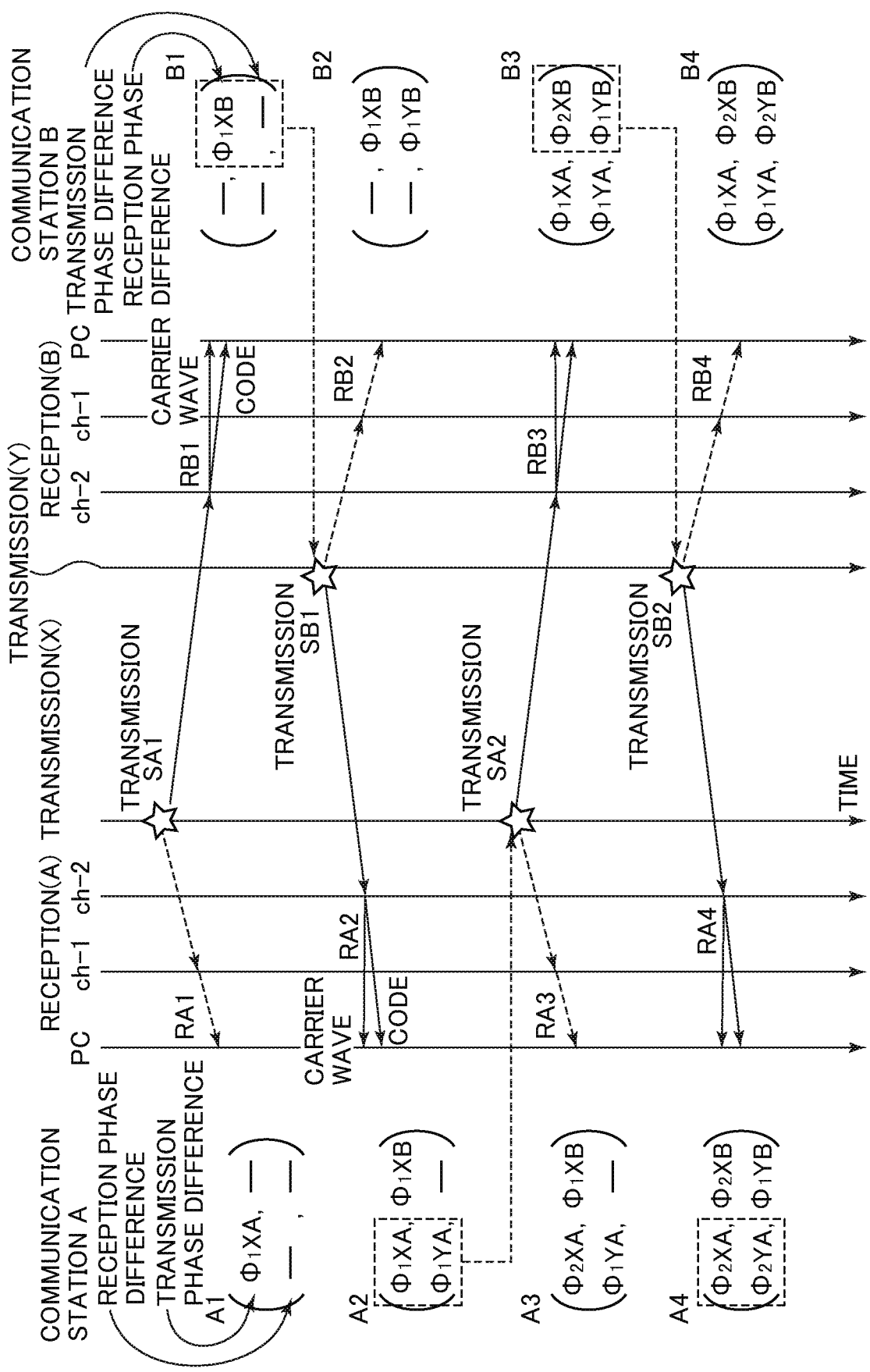
FIG. 8 is a time chart illustrating a sequence in which the method for detecting a synchronization deviation between communication stations according to the present invention is applied to the above apparatus configurations in FIGS. 1 and 2 or FIGS. 3 and 4 in terms of a phase difference.

FIG. 8 is a time chart example illustrating a sequence in which the method for detecting a synchronization deviation between communication stations according to the present invention is applied to the apparatus configurations in FIGS. 1 and 2 and FIGS. 3 and 4 in terms of the phase. This is an example of a method for detecting, in the first communication station (A) and the second communication station (B) selected from among two or more communication stations that are connected to each other via a communication method to be capable of communicating with each other, a deviation in time clock phase.

Also in this embodiment, the communication stations each clock time in a corresponding manner. In addition, the second communication station receives a first communication station signal that is transmitted from the first communication station and is transferred as a signal that is synchronized with the clock X of the first communication station, and the first communication station receives a second communication station signal that is transmitted from the second communication station and is transferred as a signal that is synchronized with the clock signal (Y) of the second communication station. The first and second communication station signals have a phase difference that is converted into a predetermined common frequency. Transmission phase difference information of each station in this case is the phase difference obtained by comparing a signal that is transmitted from the transmitter (3X, 3Y) of the own station and is received by the receiver and demodulator (4, 4X, or 4Y) of the own station with the phase of the clock A or the clock B of the own station.

(1) The first communication station transmits the first communication station signal at the time point of SA1 in FIG. 8, receives the transmitted first communication station signal at the time point of RA1, and measures and records a phase difference ($\Phi_1 XA$) between the transmitter X of the received first communication station signal and the clock A of the first communication station signal. A1 represents the details of the register A provided in the computer (7) of the communication station A at this time point.

(2) The second communication station receives the first communication station signal at RB1 and measures and records a phase difference ($\Phi_1 XB$) between the received first communication station signal and the clock B of the second communication station signal. B1 represents the details of the register B provided in the computer (7) of the communication station B at this time point.

(3) The second communication station transmits the second communication station signal and the phase difference ($\Phi_1 XB$) at SB1, receives the transmitted second communication station signal at RB2, and measures and records a phase difference ($\Phi_1 YB$) between the received second communication station signal and the clock B of the second communication station signal. B2 represents the details of the register B at this time point.

(4) The first communication station receives the second communication station signal and the phase difference ($\Phi_1 XB$) at RA2 and measures and records a phase difference ($\Phi_1 YA$) between the received second communication station signal and the clock A of the first communication station signal. A2 represents the details of the register A at this time point.

(5) The first communication station transmits the first communication station signal, the phase difference ($\Phi_1 XA$), and the phase difference ($\Phi_1 YA$) at SA2 and receives the transmitted first communication station signal at RA3. A3 represents the details of the register A obtained as a result of the reception at RA3.

(6) The second communication station signal receives at least the phase difference ($\Phi_1 XA$) and the phase difference ($\Phi 1YA$) among the first communication station signal, the phase difference ($\Phi_1 XA$), and the phase difference ($\Phi_1 YA$) at RB3. B3 represents the details of the register B at this time point.

(7) The second communication station transmits at least the phase difference ($\Phi_1 YB$) at SB2.

(8) The first communication station receives at least the phase difference ($\Phi_1 YB$). A4 represents the details of the register A at this time point.

For each of a phase difference $\Phi X$ obtained by subtracting the phase difference ($\Phi_1 XA$) from the phase difference ($\Phi_1 XB$) and a phase difference $\Phi Y$ obtained by subtracting the phase difference ($\Phi_1 YB$) from the phase difference ($\Phi_1 YA$), a transfer phase difference ($\Phi p$) between the first communication station and the second communication station is derived on the basis of an arithmetic mean of the phase differences $\Phi X$ and $\Phi Y$. That is, $$\Phi p = (\Phi X + \Phi Y)/2 \qquad [\text{Math. 8}]$$

In addition, a phase difference ($\Phi c$) due to a deviation in time at the second communication station from the time of the first communication station is derived on the basis of an arithmetic mean of phase differences $\Phi X$ and $-\Phi Y$. That is, $$\Phi c = (\Phi X - \Phi Y)/2 \qquad [\text{Math. 9}]$$

Note that, in FIG. 1 or FIG. 3, the phase data to be input to the transmitter 3X is A4 in FIG. 8, and the phase data to be output from the carrier wave phase and reception time analyzer 6 and the reception information decoder 5 is that received at RA4 in FIG. 8. Similarly, in FIG. 2 or FIG. 4, the phase data to be input to the transmitter 3X is B3 in FIG. 8, and the phase data to be output from the carrier wave phase and reception time analyzer 6 and the reception information decoder 5 is that received at RB3 in FIG. 8.

Third Embodiment

FIGS. 5 and 6 illustrate apparatus configuration examples in which the transmission antenna and the reception antenna are shared. In these configurations, instead of the clock X of the communication station A, the clock A or a signal synchronized with the clock A is used. Also in the communication station B, instead of the clock Y, the clock B or a signal synchronized with the clock B is used. In addition, as the transmission antenna and the reception antenna, a shared antenna 13 is used, and transmission and reception is switched by using a directional coupler. With such an antenna system, a slight deviation in impedance matching causes a reflected wave from the antenna to be input to the receiver and demodulator 4. In this embodiment, a transmission timestamp is obtained by using the reflected wave. That is, the transmission time information (TXA) from the first communication station to the second communication station and the transmission time information (TYB) from the second communication station to the first communication station are each measured by receiving a reflection signal from a corresponding antenna.

If a reflection signal with a sufficient intensity cannot be obtained in a case of wired transfer using a coaxial cable, an optical fiber, or the like, a point where the transfer impedance is discontinuous is provided as a transmission terminal on the transfer path to be used as a reflection point for the transmission/reception signal, and any deviation in phase or time at the time of passing therethrough can be detected.

This configuration is advantageous in that the electromagnetic wave propagation paths can completely correspond to each other, and thus, a condition for an equal round-trip electromagnetic wave propagation time can be realized between the communication stations A and B, which are assumed to detect a synchronization deviation. In addition, in this embodiment, the communication stations A and B respectively serve as the master and the slave, and the clock of the communication station B is set to be synchronized with that of the communication station A.

FIG. 5 is an example of the communication station A, in which FIG. 5 ($\Phi$) is the configuration example related to the phase and FIG. 5 (t) is the configuration example related to the time. The clock signal contained in the electromagnetic wave that is input through the antenna (13) and a directional coupler (14) and the clock A from the frequency generator (1) are mixed in the receiver and demodulator (4), and its phase difference is measured by the carrier-wave phase acquiring means (6). In this example, the clock A is generated by autonomous oscillation. The output from the carrier wave phase and reception time analyzer (6) is input to the computer (7). The computer (7) also receives information from the communication station B, which has been demodulated by the receiver and demodulator (4). This information is time information or phase information and may contain information on the above-described synchronous/non-synchronous setting. In the example of FIG. 5, the information on the synchronous/non-synchronous setting is supplied from the receiver and demodulator (4) to the reception information decoder (5), the computer (7), and the controller (20). The computer (7) controls the transmission of the transmitter (3X) to implement two-way communication at the common frequency. The computer (7) further performs control related to transmission details and transmission time from the transmitter (3X), stores data necessary for detecting a synchronization deviation, and performs data processing. A signal from the transmitter (3X) is based on the clock from the frequency generator (1) and is transmitted through the directional coupler (14) and the antenna (13).

FIG. 6 is an example of the communication station B. The difference from the configuration in FIG. 5 is that the clock B of the frequency generator (1) is not generated by autonomous oscillation but is controlled by the computer (7) so as to be synchronized with the integrated phase of the communication station A. This synchronization may be time synchronization or phase synchronization.

As in this case in which the transmission time is determined by measuring the time of a reflected wave from the antenna, the object of the present invention can be achieved by performing the sequence in the second embodiment.

Next, an example will be illustrated in which the transmission from the communication station A and the communication station B is transmission at a designated time and a scheduled time with a predetermined time difference. That is, in this case, a deviation of the transmission time from a scheduled transmission time is negligible, and it is unnecessary to measure the transmission time by receiving a reflection signal from the antenna.

Figure 9:
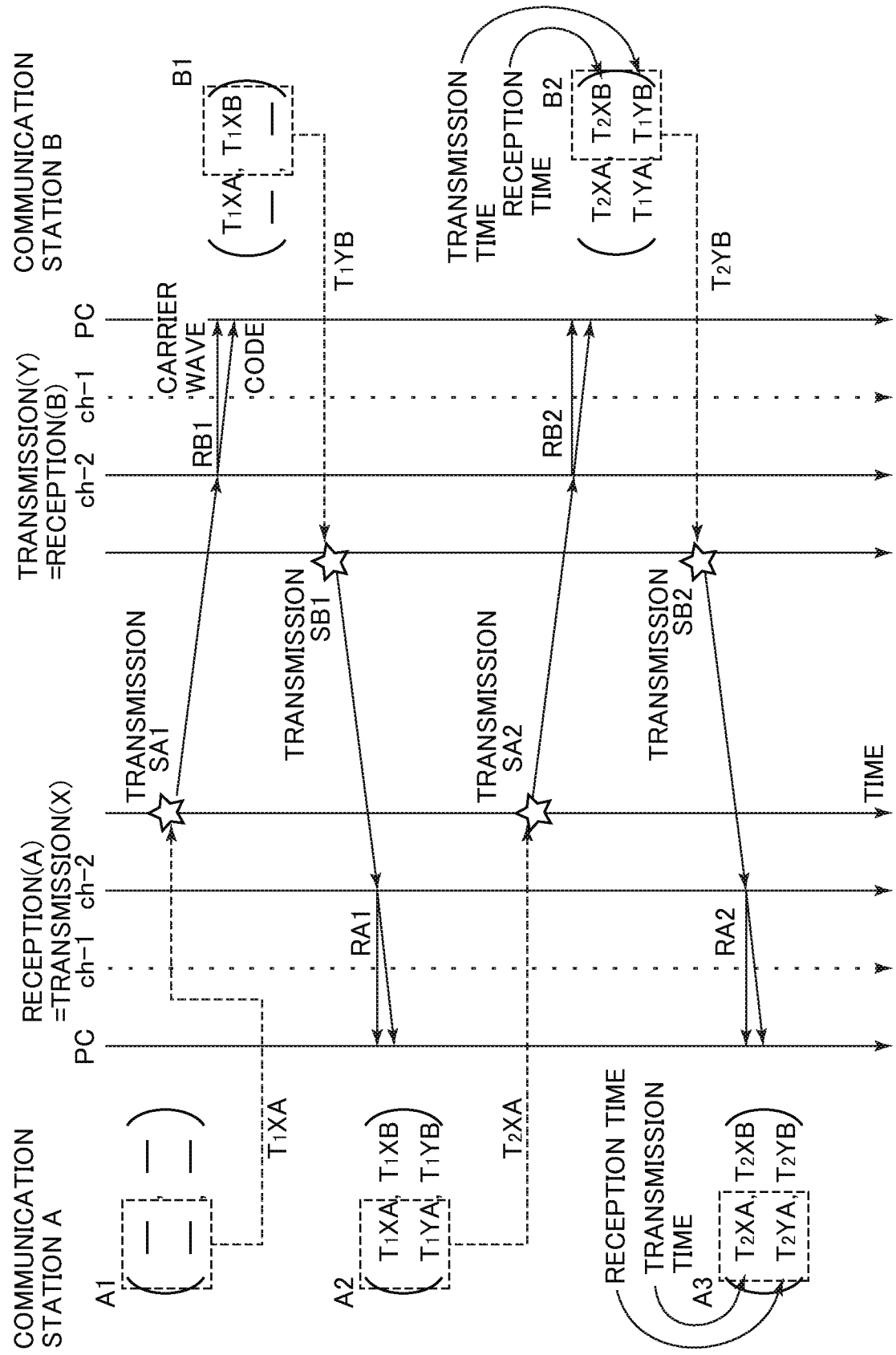
FIG. 9 is a time chart illustrating a sequence in which the method for detecting a synchronization deviation between communication stations according to the present invention is applied to the above apparatus configurations in FIGS. 5 and 6 in terms of time.

FIG. 9 is a time chart illustrating a sequence for synchronization control by detecting a synchronization deviation between the communication station A and the communication station B in FIG. 5 and FIG. 6 in a case of using the scheduled transmission time as the transmission time. Accordingly, in the first and second communication stations selected from among two or more communication stations that are connected to each other via a communication method to be capable of communicating with each other, a deviation in time between the time (clock A) of the first communication station and the time (clock B) of the second communication station is detected. The communication stations each clock time in a corresponding manner.

Predetermined empty information is transmitted in a case of transmission of undetermined time information among transmission time information (TXA) from the first communication station to the second communication station, transmission time information (TYB) from the second communication station to the first communication station, reception time (TXB) of a clock at the second communication station in a transmission from the first communication station to the second communication station, and reception time (TYA) of a clock at the first communication station in a transmission from the second communication station to the first communication station.
In addition, the transmission time information (TXA) transmitted from the first communication station is used as a signal for synchronization transmitted from the first communication station, and the transmission time information (TYB) transmitted from the second communication station is used as a signal for synchronization transmitted from the second communication station.

(1) The first communication station transmits a scheduled transmission time $T_1XA$ at the time point of SA1 in FIG. 9 and records the transmission time $T_1XA$. A1 represents the details of the register A provided in the computer (7) of the communication station A at this time point.

(2) The second communication station receives $T_1XA$ at the time point of RB1 and records its reception time $T_1XB$. B1 represents the details of the register B provided in the computer (7) of the communication station B at this time point.

(3) The second communication station transmits $T_1XB$ and its transmission time scheduled time $T_1YB$ at SB1 and records the transmission time $T_1YB$ of $T_1XB$.

(4) The first communication station receives $T_1XB$ and $T_1YB$ at RA1 and records its reception time $T_1YA$. A1 represents the details of the register A at this time point.

(5) The first communication station transmits at least $T_1YA$ among $T_2XA$ and $T_1YA$ at SA2. (6) The second communication station receives at least $T_1YA$ at RB2. B2 represents the details of the register B at this time point.

In a process including this sequence, for a set of input values of $T_1XA$, $T_1XB$, $T_1YA$, and $T_1YB$, for each communication station, a transfer time of signal (Tp) between the first communication station and the second communication station is derived on the basis of an arithmetic mean of an increase (ΔTXB-A) from $T_1XA$ to $T_1XB$ and an increase (ΔTYA-B) from $T_1YB$ to $T_1YA$. That is, $$Tp = \frac{1}{2}[(T_1XB - T_1XA) + (T_1YA - T_1YB)]. \qquad \text{[Math. 10]}$$

The deviation in time (Tc) between the first communication station and the second communication station is determined by subtracting the increase (ΔTXB-A) from the transfer time or by subtracting the transfer time from the increase (ΔTYA-B). That is, Tc=Tp−($T_1XB$−$T_1XA$)=($T_1YA$−$T_1YB$)−Tp, and the following representation is also possible.

$$Tc = \frac{1}{2}[(T_1YA - T_1YB) - (T_1XB - T_1XA)] \qquad \text{[Math. 11]}$$

It is easy to dissolve the deviation in time between the communication stations A and B by using this Tc.

Fourth Embodiment

Figure 10:
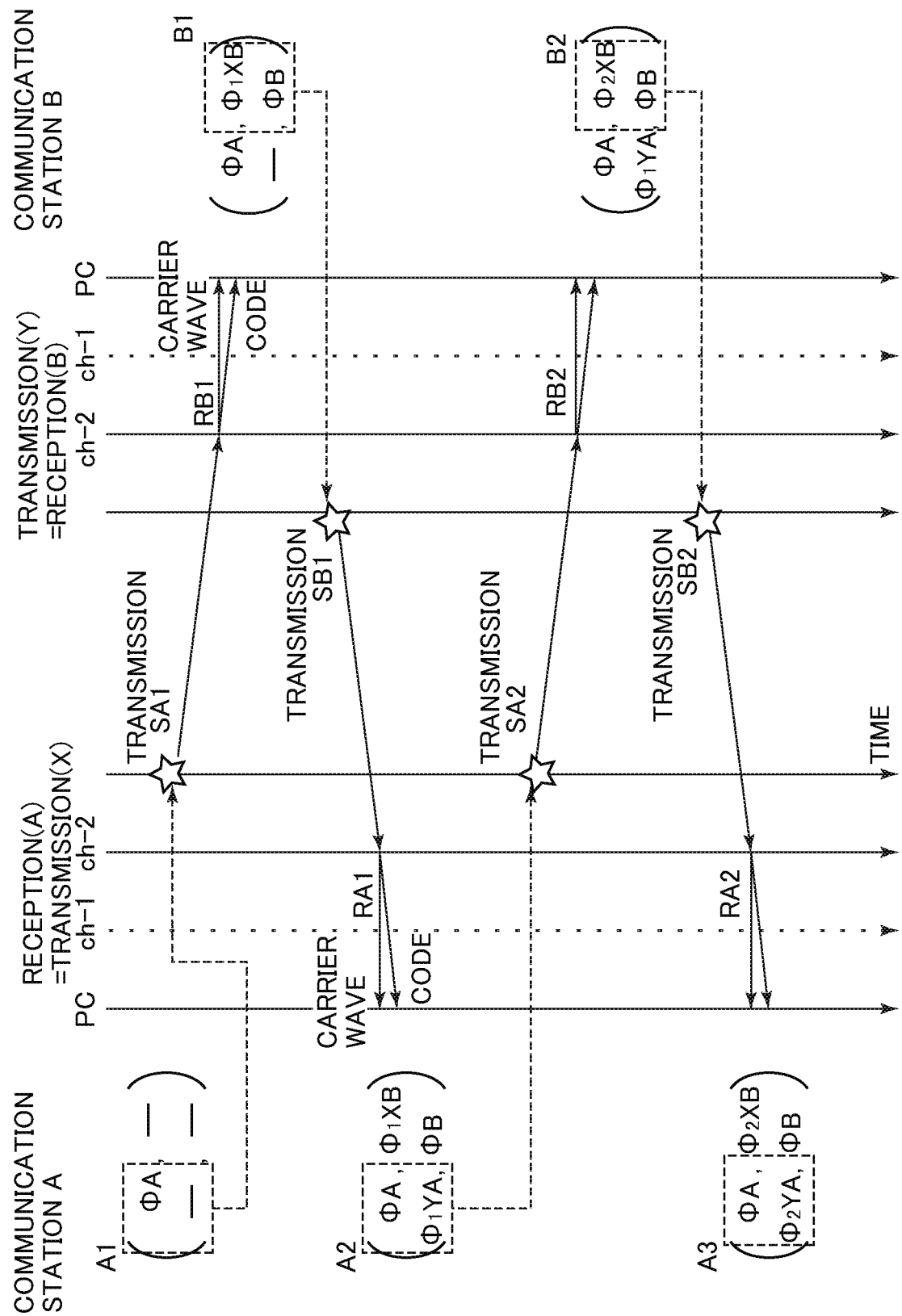
FIG. 10 is a time chart illustrating a sequence in which the method for detecting a synchronization deviation between communication stations according to the present invention is applied to the above apparatus configurations in FIGS. 5 and 6 in terms of a phase difference.

FIG. 10 is a time chart example illustrating a sequence in which the method for detecting a synchronization deviation between communication stations according to the present invention is applied to the apparatus configurations in FIGS. 5 and 6 in terms of the phase. In these configurations in FIGS. 5 and 6, instead of the clock X of the communication station A, the clock A or a signal synchronized with the clock A is used. Also in the communication station B, instead of the clock Y, the clock B or a signal synchronized with the clock B is used. In addition, this embodiment illustrates an example in which the transmission from the communication station A and the communication station B is transmission using a designated phase and a predetermined phase difference, and illustrates an example in which, for example, a phase difference that offsets the phase difference is added in advance. That is, this example is a case in which the deviation of a transmission phase from a scheduled transmission phase is negligible.

In a case in which the transmission time is determined by measuring the time of a reflected wave from the antenna, the object of the present invention can be achieved by performing the sequence in the second embodiment.

This is a method for detecting, in first communication station (A) and the second communication station (B) selected from among two or more communication stations that are connected to each other via a communication method to be capable of communicating with each other, a deviation in time clock phase.

The communication stations each clock time in a corresponding manner. The second communication station receives a first communication station signal that is transmitted from the transmitter (3X) of the first communication station and is synchronized with the clock A (=clock X) signal of the first communication station, and the first communication station receives a second communication station signal that is transmitted from the second communication station transmitter (3Y) and is synchronized with the clock B (=clock Y) signal of the second communication station. If the first and second communication station signals have a phase difference that is converted into a predetermined common frequency, the phase difference between the first communication station signal transmitted from the first communication station and the received first communication station signal is a predetermined phase difference (ΦA), and the phase difference between the second communication station signal transmitted from the second communication station and the received second communication station signal is a predetermined phase difference (ΦB), the following sequence is performed.

(1) The first communication station transmits the first communication station signal and the value of the phase difference (ΦA) at the time point of SA1 in FIG. 10. A1 represents the details of the register A provided in the computer (7) of the communication station A at this time point.

(2) The second communication station receives the first communication station signal and the value of the phase difference (ΦA) at the time point of RB1 and measures and records a phase difference ($\Phi_1$XB) between the received first communication station signal and the second communication station signal. B1 represents the details of the register B provided in the computer (7) of the communication station B at this time point.

(3) The second communication station transmits the second communication station signal, the value of the phase difference (ΦB), and the value of the phase difference ($\Phi_1$XB) at SB1.

(4) The first communication station receives the second communication station signal, the value of the phase difference (ΦB), and the value of the phase difference ($\Phi_1$XB) at RA1 and measures and records a phase difference ($\Phi_1$YA) between the received second communication station signal and the first communication station signal. A2 represents the details of the register A at this time point.

(5) The first communication station transmits at least the value of the phase difference ($\Phi_1$YA) at SA2.

(6) The second communication station receives at least the value of the phase difference ($\Phi_1$YA) at RB2. B2 represents the details of the register B at this time point.

As long as there is no variation, the phase differences ΦA and ΦB only have to be exchanged once and does not have to be exchanged plural times. Here, for a phase difference ΦX obtained by subtracting the phase difference (ΦA) from the phase difference ($\Phi_1$XB) and a phase difference ΦY obtained by subtracting the phase difference (ΦB) from the phase difference ($\Phi_1$YA), a transfer phase difference (Φp) between the first communication station and the second communication station is derived on the basis of an arithmetic mean of ΦX and the phase difference ΦY. That is, the following is satisfied.

$$\Phi p = (\Phi X + \Phi Y)/2 \quad \text{[Math. 12]}$$

In addition, a phase difference (Φc) due to a deviation in time at the second communication station from the time of the first communication station is derived on the basis of an arithmetic mean of phase differences ΦX and −ΦY. That is, the following is satisfied.

$$\Phi c = (\Phi X - \Phi Y)/2 \quad \text{[Math. 13]}$$

It is easy to dissolve the phase difference due to the deviation in time between the communication stations A and B by using this Φc.

Note that the phase data to be input to the transmitter 3X in FIG. 5 is A3 in FIG. 10, the phase data to be output from the carrier wave phase and reception time analyzer 6 and the reception information decoder 5 is that received at RA2 in FIG. 10. Similarly, the phase data to be input to the transmitter 3Y in FIG. 6 is B2 in FIG. 10, and the phase data to be output from the carrier wave phase and reception time analyzer 6 and the reception information decoder 5 is that received at RB2 in FIG. 10.

In each of the above-described embodiments, an offset phase difference generated in the first communication station or the second communication station from the corresponding reception point to the phase-difference measurement point is desirably used for correcting the received phase difference.

Fifth Embodiment

Figure 11:
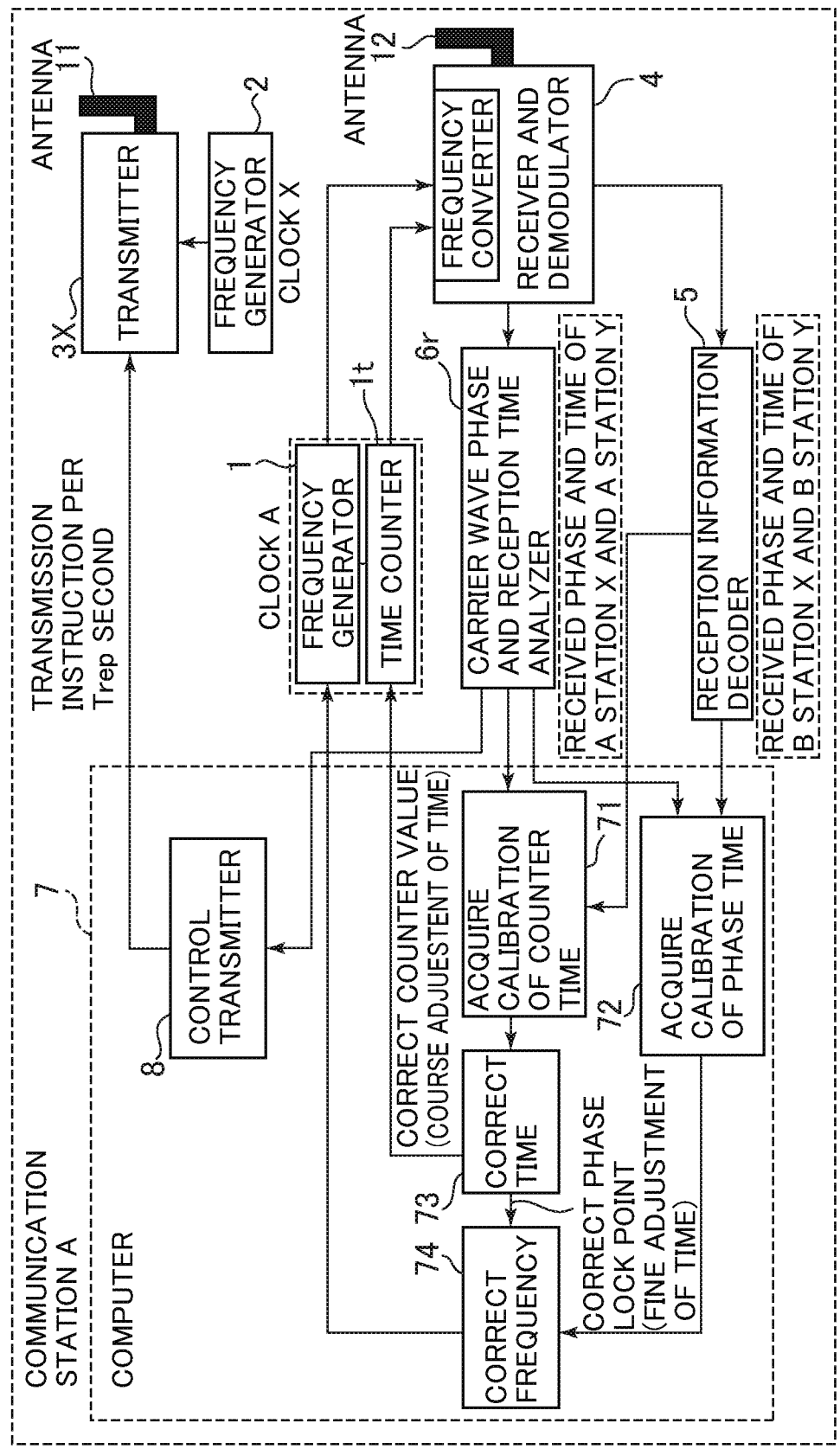
FIG. 11 is a block diagram illustrating a configuration example of the communication station A for simultaneously detecting a deviation in phase and a deviation in time in a fifth embodiment.

FIG. 11 is a block diagram illustrating a configuration example of the communication station A for simultaneously detecting a deviation in phase and a deviation in time. The communication station B may have a configuration of substantially the same block diagram. Although the configuration of this block diagram is similar to the block diagram in FIG. 1, time synchronization and phase synchronization are simultaneously performed. A time counter (1t) that measures the number of clocks from the frequency generator is included in a clock unit, and instead of the carrier-wave phase acquiring means, a carrier-wave phase and reception time acquiring means (6r) is included that acquires the reception time of the clock X signal for the transmitter (3X) of the own station and a clock Y signal for the transmitter (3Y) of the communication station B. The functions of the computer (7) include a correction of counter time acquiring unit (71), a correction of phase time acquiring unit (72), a time correcting unit (73), and a frequency correcting unit (74). Here, the correction of counter time acquiring unit (71) acquires a time difference for correction obtained through information exchange with the communication station B from the output from the carrier wave phase and reception time analyzer (6r) and the output from the reception information decoder (5). The correction of phase time acquiring unit (72), in response to the output from the reception information decoder (5), acquires a phase difference for correction and, in response to the output from the carrier wave phase and reception time analyzer (6r), performs an unwrapping process if the phase is wrapped exceeding a predetermined range of 2π. In response to the output from the correction of counter time acquiring unit (71), the time correcting unit (73) outputs correction information of the counter value for the time counter (1t) and outputs phase time difference information for the frequency correcting unit (74). In response to phase-lock-point (phase synchronization point) correction information from the time correcting unit (73) and the output from the correction of phase time acquiring unit (72), the frequency correcting unit (74) controls the advance and delay of the frequency generator (1).

Figure 12:
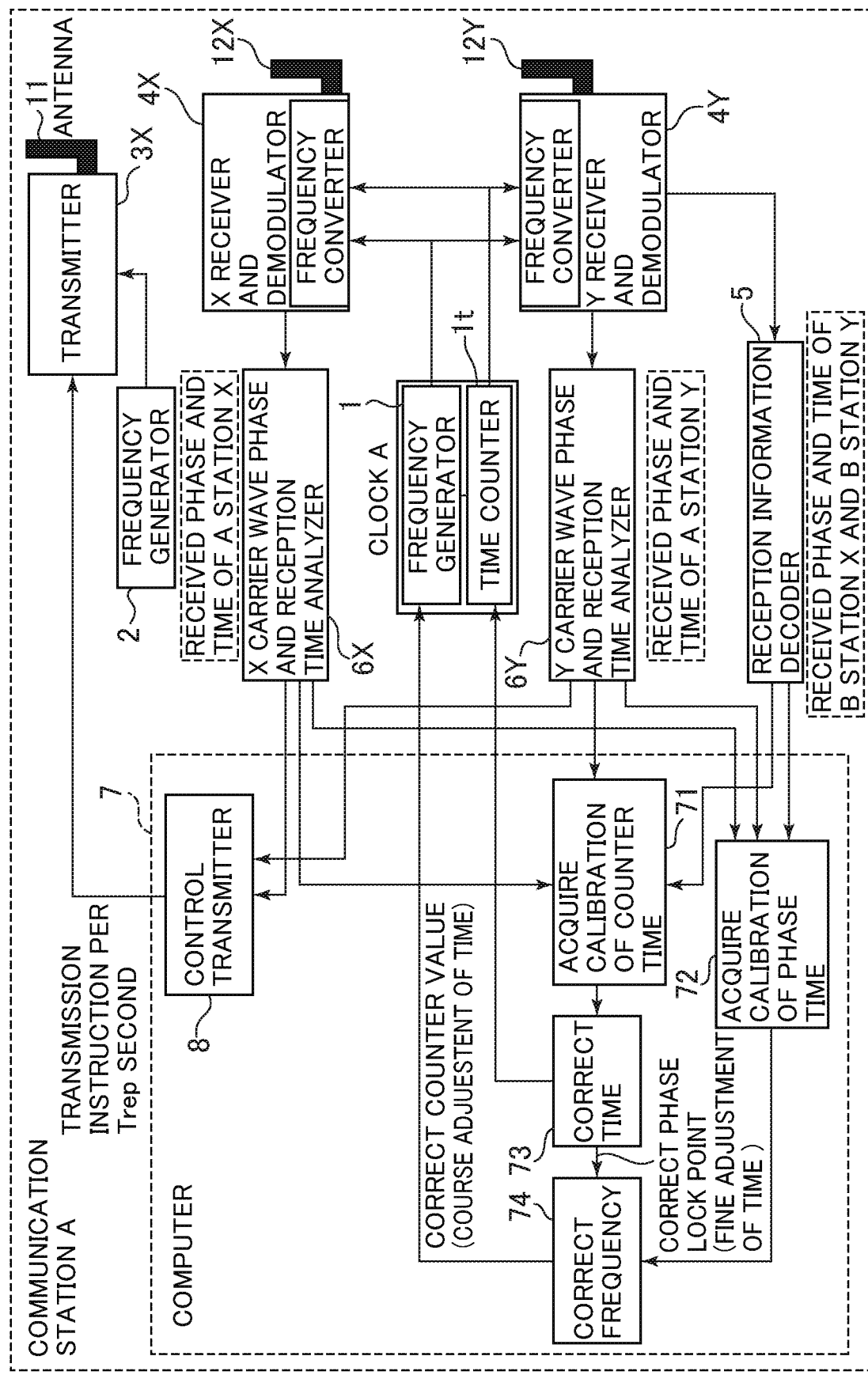
FIG. 12 is a block diagram illustrating a configuration example of the communication station A for simultaneously detecting a deviation in phase and a deviation in time by using two frequencies in the fifth embodiment.

FIG. 12 is a block diagram illustrating a configuration example of the communication station A in which the antenna and the receiver and demodulator are divided into ones for receiving an electromagnetic wave from the transmitter (3X) of the own station and ones for receiving an electromagnetic wave from the partner station for simultaneously detecting a deviation in phase and a deviation in time by using two frequencies. The communication station B may have a configuration of substantially the same block diagram. The configuration of this block diagram is similar to the block diagram in FIG. 3, and time synchronization and phase synchronization are simultaneously performed. That is, the time counter (1t) that measures the number of clocks from the frequency generator is included in a clock unit, and a carrier wave phase and reception time analyzer (6X) that also acquires the reception time of the clock X signal from the transmitter (3X) of the own station and a carrier wave phase and reception time analyzer (6y) that also acquires the reception time of the clock Y signal from the transmitter (3Y) of the communication station B are included. In addition, the functions of the computer (7) include the correction of counter time acquiring unit (71), the correction of phase time acquiring unit (72), the time correcting unit (73), and the frequency correcting unit (74). Here, the correction of counter time acquiring unit (71) acquires from the output from the carrier wave phase and reception time analyzer (6X), the output from the carrier wave phase and reception time analyzer (6Y), and the output from the reception information decoder (5). The correction of phase time acquiring unit (72), in response to the output from the reception information decoder (5), outputs a phase difference for correction for the time correcting unit means (73) and, in response to the output from the Y carrier wave phase and reception time analyzer (6Y), performs an unwrapping process if the phase is wrapped exceeding a predetermined range of 2π. In response to the output from the correction of counter time acquiring unit (71), the time correcting unit means (73) outputs correction information of the counter value for the time counter (1t) and outputs phase time difference information for the frequency correcting unit (74). In response to phase-lock-point (phase synchronization point) correction information from the time correcting unit (73) and the output from the correction of phase time acquiring unit (72), the frequency correcting unit (74) controls the advance and delay of the frequency generator (1).

Figure 13:
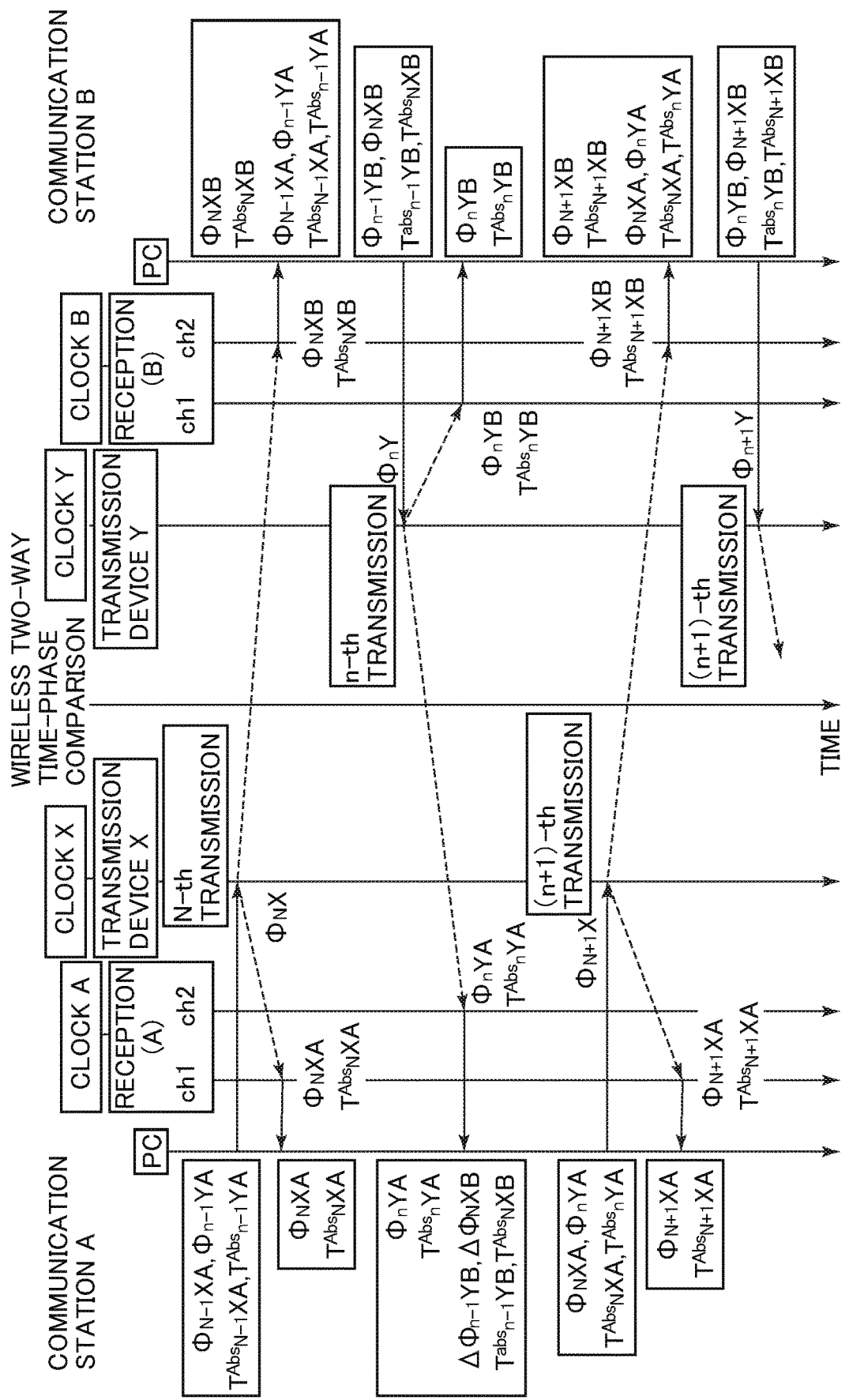
FIG. 13 is a time chart for simultaneously detecting a deviation in phase and a deviation in time in a case of using the apparatus configuration in FIG. 11 or FIG. 12.

FIG. 13 illustrates a time chart for simultaneously detecting a deviation in phase and a deviation in time in a case of using the apparatus configuration in FIG. 11 or FIG. 12. In a case of an N-th exchange of phase information and time information that are exchanged between the communication stations A and B, the register A of the computer (7) of the communication station A becomes as follows.

N-th in Station A: Phase ($\Phi_{N-1}XA$, $\Phi_{n-1}YA$, $\Phi_{N-1}XB$, $\Phi_{n-2}YB$)
Time ($T^{ABS}_{N-1}XA$, $T^{ABS}_{n-1}YA$, $T^{ABS}_{N-1}XB$, $T^{ABS}_{n-2}YB$)

<N-th Transmission>

[A]

The station A transmits a carrier wave that is modulated by using information of the register A:
Phase ($\Phi_{N-1}XA$, $\Phi_{n-1}YA$),
Time ($T^{ABS}_{N-1}XA$, $T^{ABS}_{n-1}YA$).

This carrier wave is received by the receiver and demodulator (4) of the communication station A, and as a result of signal processing in the communication station A, ($\Phi_N XA$, $T^{ABS}_N XA$) is obtained. As a result, the register A becomes as follows.

Phase ($\Phi_N XA$, $\Phi_{n-1}YA$, $\Phi_{N-1}XB$, $\Phi_{n-2}YB$),
Time ($T^{ABS}_N XA$, $T^{ABS}_{n-1}YA$, $T^{ABS}_{N-1}XB$, $T^{ABS}_{n-2}YB$)

This carrier wave is received by the receiver and demodulator (4) of the communication station B, and as a result of signal processing in the communication station B, ($\Phi_N XB$, $T^{ABS}_N XB$) is obtained. As a result, information stored in the register B of the computer (7) of the communication station B becomes as follows.

Phase ($\Phi_{N-1}XA$, $\Phi_{n-1}YA$, $\Phi_N XB$, $\Phi_{n-1}YB$),
Time ($T^{ABS}_{N-1}XA$, $T^{ABS}_{n-1}YA$, $T^{ABS}_N XB$, $T^{ABS}_{n-1}YB$)

[B]

Subsequently, the communication station B transmits the following information.

Phase ($\Phi_N XB$, $\Phi_{n-1}YB$),
Time ($T^{ABS}_N XB$, $T^{ABS}_{n-1}YB$)

This signal is received by the own station, and ($\Phi_n YB$, $T^{ABS}_n YB$) is obtained. The register B becomes as follows.

Phase ($\Phi_{N-1}XA$, $\Phi_{n-1}YA$, $\Phi_N XB$, $\Phi_n YB$),
Time ($T^{ABS}_{N-1}XA$, $T^{ABS}_{n-1}YA$, $T^{ABS}_N XB$, $T^{ABS}_n YB$)

This signal is received by the communication station A, and as a result of signal processing, ($\Phi_n YA$, $T^{ABS}_n YA$) is obtained. Together with the received information, the register A becomes as follows.

Phase ($\Phi_N XA$, $\Phi_n YA$, $\Phi_N XB$, $\Phi_{n-1}YB$),
Time ($T^{ABS}_N XA$, $T^{ABS}_n YA$, $T^{ABS}_N XB$, $T^{ABS}_{n-1}YB$)

<(N+1)-th Transmission>

[A]

Subsequently, the communication station A transmits the following information.

Phase ($\Phi_N XA$, $\Phi_n YA$),
Time ($T^{ABS}_N XA$, $T^{ABS}_n YA$)

This signal is received by the own station, and as a result of signal processing, ($\Phi_{N+1}XA$, $T^{ABS}_{N+1}XA$) is obtained.

Phase ($\Phi_{N+1}XA$, $\Phi_n YA$, $\Phi_N XB$, $\Phi_{n-}YB$),
Time ($T^{ABS}_{N+1}XA$, $T^{ABS}_n YA$, $T^{ABS}_N XB$, $T^{ABS}_{n-1}YB$)

The signal is received by the communication station B, and as a result of signal processing, ($\Phi_{N+1}XB$, $T^{ABS}_{N+1}XB$) is obtained. Together with the received information, the register B becomes as follows.

Phase ($\Phi_N XA$, $\Phi_n YA$, $\Phi_{N+1}XB$, $\Phi_n YB$),
Time ($T^{ABS}_N XA$, $T^{ABS}_n YA$, $T^{ABS}_{N+1}XB$, $T^{ABS}_n YB$)

[B]

Subsequently, the communication station B transmits the following information.

Phase ($\Phi_{N+1}XB$, $\Phi_n YB$),
Time ($T^{ABS}_{N+1}XB$, $T^{ABS}_n YB$)

This signal is received by the communication station A, and as a result of signal processing, ($\Phi_{n+1}YA$, $T^{ABS}_{n+1}YA$) is obtained. Together with the received information, the register A becomes as follows.

Phase ($\Phi_{N+1}XA$, $\Phi_{n+1}YA$, $\Phi_{N+1}XB$, $\Phi_n YB$),
Time ($T^{ABS}_{N+1}XA$, $T^{ABS}_{n+1}YA$, $T^{ABS}_{N+1}XB$, $T^{ABS}_n YB$)

By using the values of the N-th and n-th subscripts, both the communication stations can obtain the following values Phase ($\Phi_N XA$, $\Phi_n YA$, $\Phi_N XB$, $\Phi_n YB$)
Time ($T^{ABS}_N XA$, $T^{ABS}_n YA$, $T^{ABS}_N XB$, $T^{ABS}_n YB$). Here, if $$\Delta T_N^{ABS}X = T_N^{ABS}XA - T_N^{ABS}XB$$

$$\Delta T_n^{ABS}Y = T_n^{ABS}YB - T_n^{ABS}YA$$

$$\Delta \Phi_N X = \Phi_N XA - \Phi_N XB$$

$$\Delta \Phi_n Y = \Phi_n YB - \Phi_n YA \qquad \text{[Math. 14]}$$

is satisfied, the signal transfer time between the communication stations A and B is determined on the basis of a mean of $\Delta T^{ABS}_N X$ and $\Delta T^{ABS}_n Y$, and a deviation in time is determined on the basis of a mean of $\Delta T^{ABS}_N X$ and $(-1)\times \Delta T^{ABS}_n Y$. Similarly, a phase difference for signal transfer is determined on the basis of a mean of $\Delta \Phi_N X$ and $\Delta \Phi_n Y$, and a deviation in phase is determined on the basis of a mean of $\Delta \Phi_N X$ and $(-1)\times \Delta \Phi_n Y$.

Here, as for the quotient obtained by dividing the time difference by the cycle length of a clock and the remainder, the quotient is transmitted to the time counter to be corrected, and the remainder is used for correcting the phase lock point for fine adjustment of the time. In addition, in the correction of the phase lock point, a phase exceeding $2\pi$ is desirably transferred little by little, by a value that is sufficiently smaller than $2\pi$, to the integrated phase.

When the deviation in phase and the deviation in time are simultaneously detected as in the above case, first, the phase is surely locked, and then the time difference is repeatedly measured in this state, and thereby the time difference can be measured more precisely.

Sixth Embodiment

Figure 14:
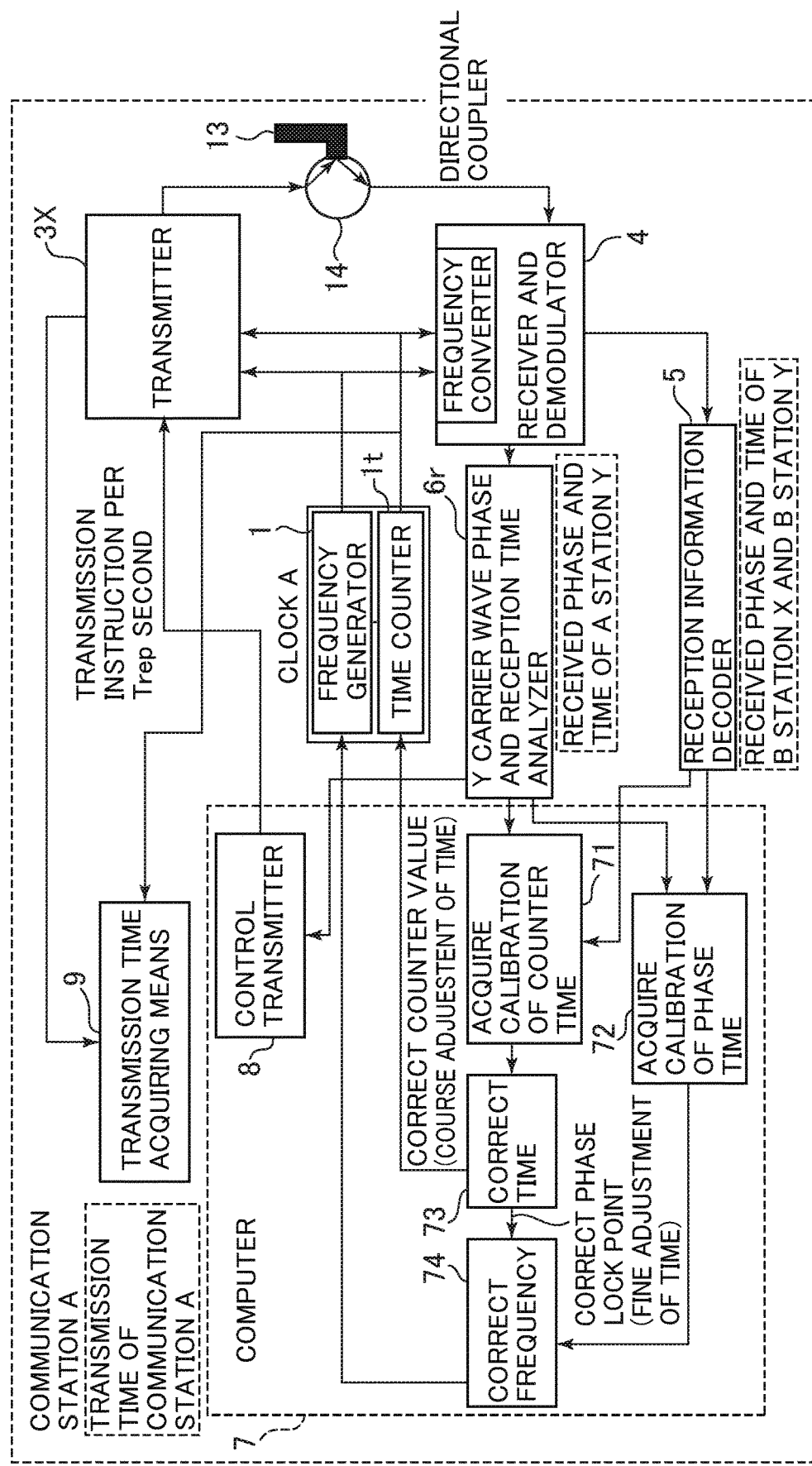
FIG. 14 is a block diagram of the communication station A in a sixth embodiment. In this configuration, the clock X is the same as the clock A, a shared antenna is used as a transmission antenna and a reception antenna, and an input of a reflected wave from the antenna to a receiver and demodulator is used for obtaining a timestamp at the time of transmission from the first communication station to the second communication station.

FIG. 14 is a block diagram illustrating a configuration example in which a signal synchronized with the clock A is used as the clock X of the communication station A as in FIG. 5, and, for example, the clock A is split. Also in the communication station B, a signal synchronized with the clock B is used as the clock Y. In addition, the shared antenna (13) is used as the transmission antenna and the reception antenna, and transmission and reception is switched by using a directional coupler.

The configuration of this block diagram includes a transmission-time acquiring means (9), the time counter (1t) that measures the number of clocks from the frequency generator (1) in a clock unit, and the carrier wave phase and reception time analyzer (6r) that acquires the reception time of the clock X signal of the own station and the clock Y signal of the communication station B. The functions of the computer (7) are different in including the functions of the correction of counter time acquiring unit (71), the correction of phase time acquiring unit (72), the time correcting unit (73), and the frequency correcting unit (74). Here, the correction of counter time acquiring unit (71) is different in acquiring a time difference for correction obtained through information exchange with the communication station B from the output from the carrier wave phase and reception time analyzer (6r) and the output from the reception information decoder (5). The correction of phase time acquiring unit (72), in response to the output from the reception information decoder (5), acquires a phase difference for correction and, in response to the output from the carrier wave phase and reception time analyzer (6r), performs an unwrapping process if the phase is wrapped exceeding a predetermined range of $2\pi$. In response to the output from the correction of counter time acquiring unit (71) and the correction of phase time acquiring unit (72), the time correcting unit (73) outputs correction information of the counter value for the time counter (it) and outputs phase time difference information for the frequency correcting unit (74).

The transmission time of a signal from the transmitter (3X) is acquired by the transmission-time acquiring means (9). This transmission time is determined on the basis of, for example, a pulse train generated from a signal from the frequency generator 1. If a slight error is allowable, the transmission time according to an instruction from the computer 7 may be corrected in a predetermined manner to be used as the transmission time. As in the case of the above-described first embodiment or the like, the accurate transmission time can be acquired by the receiver and demodulator 4 actually subjecting the transmitted signal to signal processing by using the clock signal from the frequency generator 1.

With the antenna system as that illustrated in FIG. 14, a slight deviation in impedance matching causes a reflected wave from the antenna to be input to the receiver and demodulator (4). In this embodiment, a transmission timestamp is obtained by using the receiver and demodulator (4) or the transmission-time acquiring means (9). That is, the transmission time information (TXA) from the first communication station to the second communication station and the transmission time information (TYB) from the second communication station to the first communication station are each measured by receiving a reflection signal from a corresponding transmission terminal.

As in the case of FIGS. 5 and 6, if a reflection signal with a sufficient intensity cannot be obtained in a case of wired transfer using a coaxial cable, an optical fiber, or the like, a point where the transfer impedance is discontinuous is provided as a transmission terminal on the transfer path to be used as a reflection point for the transmission signal, and any deviation in phase or time at the time of passing therethrough can be detected.

Figure 15:
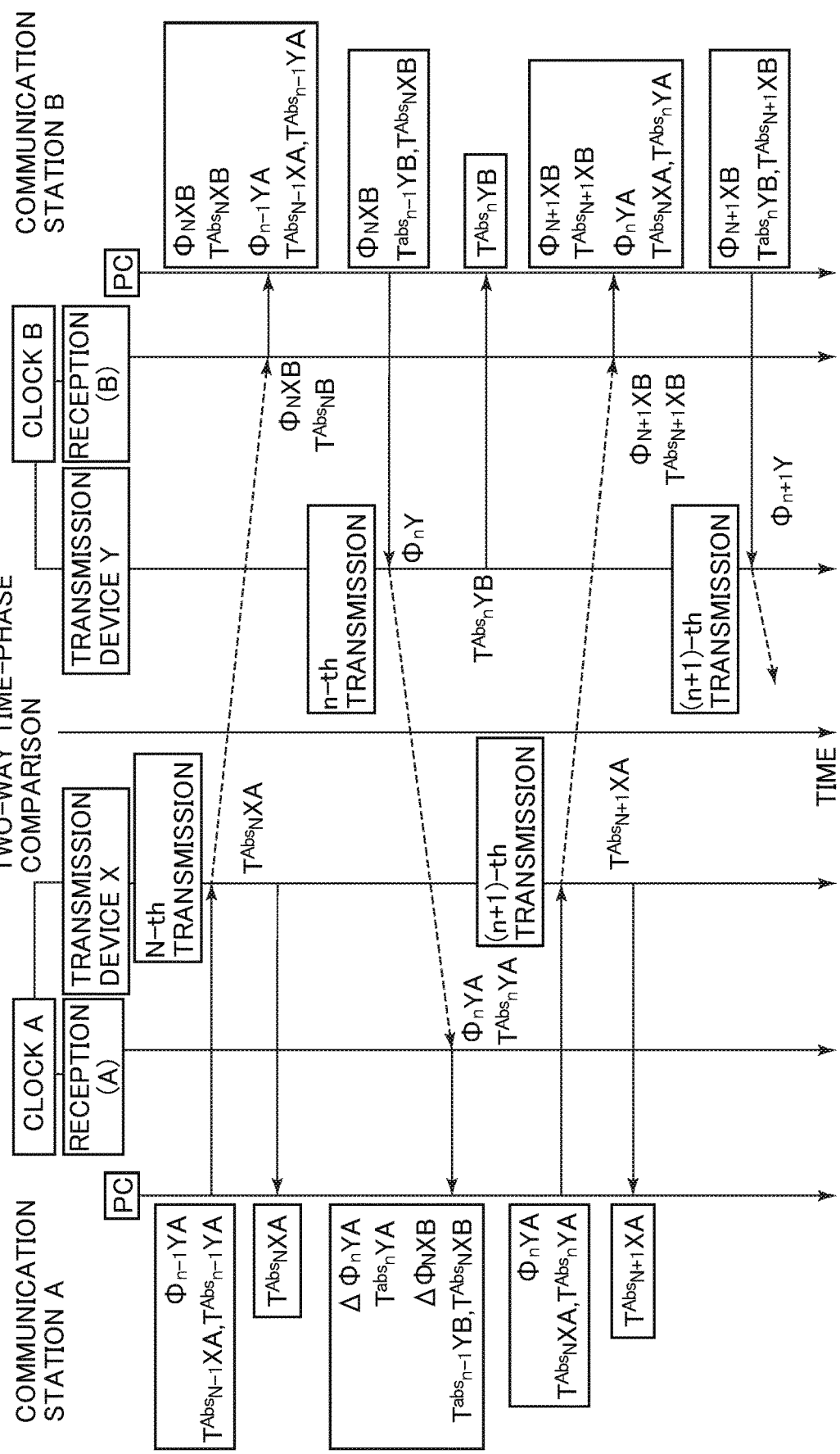
FIG. 15 is a time chart for simultaneously detecting a deviation in phase and a deviation in time in a case of using the apparatus configuration in FIG. 14 in the sixth embodiment.

Next, FIG. 15 illustrates a time chart for simultaneously detecting a deviation in phase and a deviation in time in a case of using the apparatus configuration in FIG. 14. In the following description, unlike in the third or fourth embodiment, the time of a reflected wave from the antenna is measured and used as the transmission time. However, since the clock X and the clock A are substantially the same and the clock Y and the clock B are substantially the same, $\Phi_{N-1}XA$ and $\Phi_{n-1}YB$ are fixed values. The measurement and setting in advance can reduce the measurement time and the transfer information. Accordingly, these are treated as $\Phi XA$ and $\Phi YB$.

However, if the transmission time is acquired by the transmission-time acquiring means 9 as in the above case, and if the transmission time according to an instruction from the computer 7 is corrected in a predetermined manner to be used as the transmission time, the transmission time can be treated in the same manner as the following description.

In a case of an N-th exchange of phase information and time information that are exchanged between the communication stations A and B, the register A of the computer (7) of the communication station A becomes as follows.

N-th in Station A: Phase ($\Phi XA$, $\Phi_{n-1}YA$, $\Phi_{N-1}XB$, $\Phi YB$)

Time ($T^{ABS}_{N-1}XA$, $T^{ABS}_{n-1}YA$, $T^{ABS}_{N-1}XB$, $T^{ABS}_{n-2}YB$)

<N-th Transmission>

[A]

The station A transmits a carrier wave that is modulated by using information of the register A:

Phase ($\Phi XA$, $\Phi_{n-1}YA$),

Time ($T^{ABS}_{N-1}XA$, $T^{ABS}_{n-1}YA$).

This carrier wave is received by the receiver and demodulator (4) of the communication station A, and as a result of signal processing in the communication station A, ($T^{ABS}_N XA$) is obtained. As a result, the register A becomes as follows.

Phase ($\Phi XA$, $\Phi_{n-1}YA$, $\Phi_{N-1}XB$, $\Phi YB$),

Time ($T^{ABS}_N XA$, $T^{ABS}_{n-1}YA$, $T^{ABS}_{N-1}XB$, $T^{ABS}_{n-2}YB$)

This carrier wave is received by the receiver and demodulator (4) of the communication station B, and as a result of signal processing in the communication station B, ($\Phi_N XB$, $T^{ABS}_N XB$) is obtained. As a result, information stored in the register B of the computer (7) of the communication station B becomes as follows.
Phase ($\Phi XA$, $\Phi_{n-1} YA$, $\Phi_N XB$, $\Phi YB$),
Time ($T^{ABS}_{N-1} XA$, $T^{ABS}_{n-1} YA$, $T^{ABS}_N XB$, $T^{ABS}_{n-1} YB$)
[B]
Subsequently, the communication station B transmits the following information.
Phase ($\Phi_N XB$),
Time ($T^{ABS}_N XB$, $T^{ABS}_{n-1} YB$)
This signal is received by the own station, and ($T^{ABS}_n YB$) is obtained. The register B becomes as follows.
Phase ($\Phi XA$, $\Phi_{n-1} YA$, $\Phi_N XB$, $\Phi YB$),
Time ($T^{ABS}_{N-1} XA$, $T^{ABS}_{n-1} YA$, $T^{ABS}_N XB$, $T^{ABS}_n YB$)
This signal is received by the communication station A, and as a result of signal processing, ($\Phi_n YA$, $T^{ABS}_n YA$) is obtained. Together with the received information, the register A becomes as follows.
Phase ($\Phi XA$, $\Phi_n YA$, $\Phi_N XB$, $\Phi YB$),
Time ($T^{ABS}_N XA$, $T^{ABS}_n YA$, $T^{ABS}_N XB$, $T^{ABS}_{n-1} YB$)
<(N+1)-th Transmission>
[A]
Subsequently, the communication station A transmits the following information.
Phase ($\Phi_n YA$),
Time ($T^{ABS}_N XA$, $T^{ABS}_n YA$)
This signal is received by the own station, and as a result of signal processing, ($T^{ABS}_{N+1} XA$) is obtained. At this time point.
Phase ($\Phi XA$, $\Phi_n YA$, $\Phi_N XB$, $\Phi_n YB$),
Time ($T^{ABS}_{N+1} XA$, $T^{ABS}_n YA$, $T^{ABS}_N XB$, $T^{ABS}_{n-1} YB$)
The signal is received by the communication station B, and as a result of signal processing, ($\Phi_{N+1} XB$, $T^{ABS}_{N+1} XB$) is obtained. Together with the received information, the register B becomes as follows.
Phase ($\Phi XA$, $\Phi_n YA$, $\Phi_{N+1} XB$, $\Phi YB$),
Time ($T^{ABS}_N XA$, $T^{ABS}_n YA$, $T^{ABS}_{N+1} XB$, $T^{ABS}_n YB$)
At this stage, the communication station B can obtain the following values.
Phase ($\Phi XA$, $\Phi_n YA$, $\Phi_N XB$, $\Phi YB$),
Time ($T^{ABS}_N XA$, $T^{ABS}_n YA$, $T^{ABS}_N XB$, $T^{ABS}_n YB$).
[B]
Subsequently, the communication station B transmits the following information.
Phase ($\Phi_{N+1} XB$),
Time ($T^{ABS}_{N+1} XB$, $T^{ABS}_n YB$)
This signal is received by the own station, and ($T^{ABS}_{n+1} YB$) is obtained. The register B becomes as follows.
Phase ($\Phi XA$, $\Phi_{n-1} YA$, $\Phi_N XB$, $\Phi YB$),
Time ($T^{ABS}_{N-1} XA$, $T^{ABS}_{n-1} YA$, $T^{ABS}_N XB$, $T^{ABS}_{n+1} YB$)
This signal is received by the communication station A, and as a result of signal processing, ($\Phi_{n+1} YA$, $T^{ABS}_{n+1} YA$) is obtained. Together with the received information, the register A becomes as follows.
Phase ($\Phi XA$, $\Phi_{n+1} YA$, $\Phi_{N+1} XB$, $\Phi YB$),
Time ($T^{ABS}_N XA$, $T^{ABS}_{n+1} YA$, $T^{ABS}_{N+1} XB$, $T^{ABS}_n YB$)
Here, by using the values of the N-th and n-th subscripts, if $$\Delta T_N^{ABS} X = T_N^{ABS} XA - T_N^{ABS} XB$$

$$\Delta T_n^{ABS} Y = T_n^{ABS} YB - T_n^{ABS} YA$$

$$\Delta \Phi_N X = \Phi XA - \Phi_N XB$$

$$\Delta \Phi_n Y = \Phi YB - \Phi_n YA \quad \text{[Math. 15]}$$

is satisfied, the signal transfer time between the communication stations A and B is determined on the basis of a mean of $\Delta T^{ABS}_N X$ and $\Delta T^{ABS}_n Y$, and a deviation in time is determined on the basis of a mean of $\Delta T^{ABS}_N X$ and $(-1) \times \Delta T^{ABS}_n Y$. Similarly, a phase difference for signal transfer is determined on the basis of a mean of $\Delta \Phi_N X$ and $\Delta \Phi_n Y$, and a deviation in phase is determined on the basis of a mean of $\Delta \Phi_N X$ and $(-1) \times \Delta \Phi_n Y$.

In the above embodiment, if a synchronization deviation in time is detected, the phases of clocks between the communication stations A and B are synchronized with each other so as to limit the synchronization deviation in time to one clock cycle or less in principle, and accordingly, it is obvious that phase synchronization desirably has priority over time synchronization on a statistical basis.

As for the phase or phase difference, if the amplitude exceeds $2\pi$ rad in measurement, it is wrapped to be $2\pi$ rad or less. However, an unwrapping process is performed that is well known by, for example, synthetic aperture radar image processing. It is well known that the phase even in a region exceeding $2\pi$ rad can appropriately be handled by this process. In order to perform the unwrapping process most easily, for example, if the phase jump over time is smaller than $\pi$ rad, the phase stays in the latest region; if the phase jump is larger, the phase exceeds the boundary of the latest region over time.

Seventh Embodiment

The above-described detection of a synchronization deviation between two or more communication stations can be realized by expanding the process between two communication stations described in the above embodiments to a process between two or more communication stations. This finds a communication route between any two communication stations among two or more communication stations and determines the order of the detection of a synchronization deviation between two or more communication stations at the same time by joining two communication stations that are capable of communicating with each other. In order to do so, first, the second communication station for which the detection of a synchronization deviation with the predetermined first communication station has been completed is categorized into a first communication station group together with the predetermined first communication station, and a communication station group for which the detection of a synchronization deviation is yet to be completed is categorized into a second communication station group. Then, if a communication station selected from the second communication station group
(1) is capable of communicating with a communication station belonging to the first communication station group, the category of the selected communication station is transferred from the second communication station group to the first communication station group, or
(2) is not capable of communicating with a communication station belonging to the first communication station group, a new second communication station is selected from the second communication station group, and the process returns to (1).

The above operation is performed until there is no communication station categorized into the second communication station group to an order that is feasible by a method for determining the order of the detection of a synchronization deviation.

According to the order, the detection of a synchronization deviation between communication stations is sequentially performed for a pair of the first communication station and the second communication station.

Eighth Embodiment

The detection of a synchronization deviation between two communication stations is sequentially performed in the fifth embodiment. However, in this embodiment, the detection of a synchronization deviation from a plurality of communication stations is almost simultaneously performed for a single communication station. In order to do so, first, the order of communication is determined, and then the first communication station is fixed during the operation for a single time of detection of a synchronization deviation, and the second communication station is sequentially switched. More specifically, the following is performed.

The detection of a synchronization deviation between two or more communication stations includes categorizing a communication station that is determined as being capable of communicating with the predetermined first communication station into a candidate first communication station group together with the first communication station and categorizing a communication station that is not determined as being capable of communicating into a candidate second communication station group.

For a new communication station selected from the candidate second communication station group, the following operation is performed.
(1) If communication with a communication station belonging to the candidate first communication station group is possible, the category of the selected communication station is transferred from the candidate second communication station group to the candidate first communication station group, and
(2) If communication with a communication station belonging to the candidate first communication station group is not possible, a communication station is newly selected from the candidate second communication station group, and the process returns to (1)

The above operation is performed until there is no communication station categorized into the candidate second communication station group to select one of orders that are feasible by a method for determining the order of a pair of communication stations for applying the method for detecting a synchronization deviation between communication stations.

Communication from the first communication station to a communication station that is selected as the second communication station according to the selected order is sequentially performed, and when the order comes to an end, communication from the last second communication station to the first communication station is performed in the reverse order.

INDUSTRIAL APPLICABILITY

By using the detected synchronization deviation in time or phase according to the present invention, the clock signal frequency can be matched to a phase region, but can also be used as a correction value for correcting a numeric value.

In order to realize a super-distributed-type timepiece for which a master timepiece is not set regardless of using a plurality of timepieces, instead of locking the time or phase, it is necessary to use information of a deviation in timepiece or a phase difference from the median, which is calculated by a predetermined method, as a correction value. If there are a plurality of self-controlled timepieces, the present invention is applied, and a synchronization deviation is calculated in each of the communication stations, and thereby a super-distributed-type timepiece is configured.

In addition, according to the present invention, in a case in which the present invention performs wireless communication for the communication between communication stations, the distance between the communication stations can be obtained from the propagation time including the phase obtained between the communication stations. If a reference distance is known, the refractive index of air in electromagnetic wave propagation between the communication stations and a change thereof can be obtained. The refractive index and a change thereof are known to reflect changes in temperature and humidity, and accordingly, environmental information can easily be obtained in a wide region.

REFERENCE SIGNS LIST 1, 1$t$, 2 frequency generator
3 transmitter
4, 4X, 4Y receiver and demodulator
5 reception information decoder
6, 6X, 6Y, 6$r$ carrier wave phase and reception time analyzer
7 computer
9 transmission-time acquiring means
11, 12, 12X, 12Y, 13 antenna
20 controller
71 correction of counter time acquiring unit
72 correction of phase time acquiring unit
73 time correcting unit
74 frequency correcting unit

The invention claimed is:

1. A method for detecting a synchronization deviation between communication stations, the method being a method for detecting, in first and second communication stations selected from among two or more communication stations that are connected to each other via a communication method to be capable of communicating with each other, a deviation in time between first time information that is transmitted from a transmitter (X) of the first communication station (A) and received by the first communication station and by the second communication station (B) and second time information that is transmitted from a transmitter (Y) of the second communication station and received by the first communication station and by the second communication station, the communication stations each clocking time in a corresponding manner, wherein the first time information contains first integrated phase information or first phase time information, and the second time information contains second integrated phase information or second phase time information, and transmitting predetermined empty information in a case of transmission of undetermined time information among transmission time information (TXA) from the first communication station to the second communication station, transmission time information (TYB) from the second communication station to the first communication station, reception time (TXB) of a clock at the second communication station in a transmission from the first communication station to the second communication station, and reception time (TYA) of a clock at the first communication station in a transmission from the second communication station to the first communication station, wherein TXA is a first phase time, TXB is a second phase time, TYA is a third phase time and TYB is a fourth phase time, the method comprising, in a process including:
(1) a step in which the first communication station transmits $T_1XA$ and $T_1YA$ from among a set containing $T_1XA$, $T_1XB$ and $T_1YA$ and records the transmission time $T_2XA$,
(2) a step in which the second communication station receives $T_1XA$ and $T_1YA$ and measures and records the reception time $T_2XB$,
(3) a step in which the second communication station transmits $T_2XB$ and $T_1YB$ and records the transmission time $T_2YB$,
(4) a step in which the first communication station receives $T_2XB$ and $T_1YB$ and measures and records the reception time $T_2YA$, for a set of input values of $T_1XA$, $T_1XB$, $T_1YA$, and $T_1YB$, and for a set containing $T_2XA$, $T_2XB$ and $T_2YA$, and:
deriving, at the first communication station, a transfer time of signal between the first communication station and the second communication station on the basis of an arithmetic mean of an increase ($\Delta TXB$-A) from $T_1XA$ to $T_1XB$ and an increase ($\Delta TYA$-B) from $T_1YB$ to $T_1YA$; or
determining the deviation in time between the first communication station and the second communication station by subtracting the increase ($\Delta TXB$-A) from the transfer time or by subtracting the transfer time from the increase ($\Delta TYA$-B).

2. The method for detecting a synchronization deviation between communication stations according to claim 1, wherein, in the first communication station or the second communication station, by using an offset phase difference generated from each reception point to a phase-difference measurement point, the received phase difference is corrected.

3. The method for detecting a synchronization deviation between communication stations according to claim 1, wherein communication between the first communication station and the second communication station is wireless communication, and the first communication station signal or the second communication station signal is a carrier wave that has been modulated by using information containing the phase difference $\Phi XB$ or $\Phi YA$.

4. The method for detecting a synchronization deviation between communication stations according to claim 3, wherein the wireless communication between the first communication station and the second communication station is performed by using a common frequency channel in a time shared manner.

5. The method for detecting a synchronization deviation between communication stations according to claim 3, wherein, in the wireless communication between the first communication station and the second communication station, a frequency channel in downstream communication from the first communication station to the second communication station and a frequency channel in upstream communication from the second communication station to the first communication station are different, and the downstream communication and the upstream communication are performed in time slots that are partially overlapped with each other.

6. The method for detecting a synchronization deviation between communication stations according to claim 1, wherein,
the detection of a synchronization deviation between two or more communication stations includes categorizing the second communication station, for which time synchronization with the predetermined first communication station has been completed, into a first communication station group together with the predetermined first communication station, and categorizing a communication station group, for which time synchronization is yet to be completed, into a second communication station group, and
sequentially performing time synchronization between communication stations for a pair of the first communication station and the second communication station according to an order,
the order being feasible by a method for determining the order of time synchronization by performing the following operation until there is no communication station categorized into the second communication station group, if a communication station selected from the second communication station group
(1) is capable of communicating with a communication station belonging to the first communication station group, the category of the selected communication station is transferred from the second communication station group to the first communication station group, or
(2) is not capable of communicating with a communication station belonging to the first communication station group, a new second communication station is selected from the second communication station group, and the process returns to (1).

7. The method for detecting a synchronization deviation between communication stations according to claim 1, wherein,
the detection of a synchronization deviation between two or more communication stations includes
categorizing a communication station that is determined as being capable of communicating with the predetermined first communication station into a candidate first communication station group together with the first communication station and categorizing a communication station that is not determined as being capable of communicating into a candidate second communication station group,
selecting one of orders that are feasible by a method for determining the order of a pair of communication stations for applying the method for detecting a synchronization deviation between communication stations by performing the following operation until there is no communication station categorized into the candidate second communication station group,
for a new communication station selected from the candidate second communication station group,
(1) if communication with a communication station belonging to the candidate first communication station group is possible, the category of the selected communication station is transferred from the candidate second communication station group to the candidate first communication station group, or
(2) if communication with a communication station belonging to the candidate first communication station group is not possible, a new communication station is selected from the candidate second communication station group, and the process returns to (1), and
detecting a synchronization deviation between two or more communication stations by sequentially performing communication from the first communication station to a communication station that is selected as the second communication station according to the selected order, and when the order comes to an end, performing communication from the last second communication station to the first communication station in the reverse order.

8. A method for detecting a synchronization deviation between communication stations, the method being a method for detecting, in first and second communication stations selected from among two or more communication stations that are connected to each other via a communication method to be capable of communicating with each other, a deviation in time between first time information that is transmitted from a transmitter (X) of the first communication station (A) and received by the first communication station and by the second communication station (B) and second time information that is transmitted from a transmitter (Y) of the second communication station (B) and received by the first communication station (A) and by the second communication station, the communication stations each clocking time in a corresponding manner, wherein the first time information contains first integrated phase information or first phase time information, and the second time information contains second integrated phase information or second phase time information, and transmitting empty information in a case of transmission of undetermined time information among transmission time information (TXA) from the first communication station to the second communication station, transmission time information (TYB) from the second communication station to the first communication station, reception time (TXB) of a clock at the second communication station in a transmission from the first communication station to the second communication station, and reception time (TYA) of a clock at the first communication station in a transmission from the second communication station to the first communication station, wherein TXA is a first phase time, TXB is a second phase time, TYA is a third phase time and TYB is a fourth phase time, the method comprising, in a process including (1) a step in which the first communication station transmits a signal for synchronization and records the transmission time $T_1XA$ of the signal for synchronization,
(2) a step in which the second communication station receives the signal for synchronization and $T_1XA$ and records the reception time $T_1XB$ of the signal for synchronization,
(3) a step in which the second communication station transmits a signal for synchronization and $T_1XB$ and records the transmission time $T_1YB$ of the signal for synchronization,
(4) a step in which the first communication station receives the signal for synchronization and $T_1XB$ and records the reception time $T_1YA$ of the signal for synchronization,
(5) a step in which the first communication station transmits at least $T_1XA$ and $T_1YA$,
(6) a step in which the second communication station receives at least $T_1XA$ and $T_1YA$,
(7) a step in which the second communication station transmits at least $T_1YB$, and
(8) a step in which the first communication station receives at least $T_1YB$, for a set of input values of $T_1XA$, $T_1XB$, $T_1YA$, and $T_1YB$:
deriving, at each station, a transfer time of signal between the first communication station and the second communication station on the basis of an arithmetic mean of an increase ($\Delta TXB$-A) from $T_1XA$ to $T_1XB$ and an increase ($\Delta TYA$-B) from $T_1YB$ to $T_1YA$; or determining the deviation in time between the first communication station and the second communication station by subtracting the increase ($\Delta TXB$-A) from the transfer time or by subtracting the transfer time from the increase ($\Delta TYA$-B).

9. The method for detecting a synchronization deviation between communication stations according to claim 8, wherein the transmission time information (TXA) from the first communication station to the second communication station and the transmission time information (TYB) from the second communication station to the first communication station are each measured by receiving a reflection signal from a corresponding transmission terminal.

10. The method for detecting a synchronization deviation between communication stations according to claim 8, wherein the transmission time information (TXA) from the first communication station to the second communication station, the transmission time information (TYB) from the second communication station to the first communication station, the reception time (TXB) of a clock at the second communication station in a transmission from the first communication station to the second communication station, and the reception time (TYA) of a clock at the first communication station in a transmission from the second communication station to the first communication station are each information in a state in which phases of the clocks A and B are synchronized.

11. A method for detecting a synchronization deviation between communication stations, the method being a method for detecting, in first and second communication stations selected from among two or more communication stations that are connected to each other via a communication method to be capable of communicating with each other, a deviation in clock phase between a clock A for generating first time information that is transmitted from a transmitter (X) of the first communication station (A) and received by the first communication station and by the second communication station (B) and a clock B for generating second time information that is transmitted from a transmitter (Y) of the second communication station (B) and received by the first communication station (A) and by the second communication station, the communication stations each clocking time in a corresponding manner, wherein the wherein the first time information contains first integrated phase information or first phase time information, and the second time information contains second integrated phase information or second phase time information, the second communication station receiving a first communication station signal that is transmitted from the first communication station and is synchronized with a clock X signal of the first communication station,
the first communication station receiving a second communication station signal that is transmitted from the second communication station and is synchronized with a clock Y signal of the second communication station,
the method comprising, if the first and second communication station signals have a phase difference that is converted into a predetermined common frequency:
(1) by the first communication station, transmitting the first communication station signal, receiving the transmitted first communication station signal, and measuring a phase difference ($\Phi_1XA$) between the received first communication station signal and a clock A signal from the first communication station;
(2) by the second communication station, receiving the first communication station signal and measuring a phase difference ($\Phi_1$XB) between the received first communication station signal and a clock B signal from the second communication station;

(3) by the second communication station, transmitting the second communication station signal and the phase difference ($\Phi_1$XB), receiving the transmitted second communication station signal, and measuring a phase difference ($\Phi_1$YB) between the received second communication station signal and the clock B signal from the second communication station;

(4) by the first communication station, receiving the second communication station signal and the phase difference ($\Phi_1$XB) and measuring a phase difference ($\Phi_1$YA) between the received second communication station signal and the first communication station signal;

(5) by the first communication station, transmitting the first communication station signal, the phase difference ($\Phi_1$XA), and the phase difference ($\Phi_1$YA) and receiving the transmitted first communication station signal;

(6) by the second communication station, receiving at least the phase difference ($\Phi_1$XA) and the phase difference ($\Phi_1$YA) among the first communication station signal, the phase difference ($\Phi_1$XA), and the phase difference ($\Phi_1$YA);

(7) by the second communication station, transmitting at least the phase difference ($\Phi_1$YB);

(8) by the first communication station, receiving at least the phase difference ($\Phi_1$YB); and for a phase difference $\Phi$X obtained by subtracting the phase difference ($\Phi_1$XA) from the phase difference ($\Phi_1$XB) and a phase difference $\Phi$Y obtained by subtracting the phase difference ($\Phi_1$YB) from the phase difference ($\Phi_1$YA), deriving a phase difference between the first communication station and the second communication station on the basis of an arithmetic mean of the phase differences $\Phi$X and $\Phi$Y, and deriving a phase difference due to a deviation in time at the second communication station from time of the first communication station on the basis of an arithmetic mean of phase differences $\Phi_1$X and $-\Phi$Y, wherein $\Phi_1$XA is a first integrated phase, $\Phi_1$XB is a second integrated phase, $\Phi_1$YA is a third integrated phase and $\Phi_1$YB is a fourth integrated phase.

12. The method for detecting a synchronization deviation between communication stations according to claim 11, wherein the phase difference ($\Phi$XA) transmitted from the first communication station to the second communication station and the phase difference ($\Phi$YB) transmitted from the second communication station to the first communication station are each measured by receiving a reflection signal from a corresponding transmission terminal.

13. The method for detecting a synchronization deviation between communication stations according to claim 11, wherein, in the measurement of the phase difference, the phase difference is an unwrapped value using a predetermined time as a starting point.

* * * * *